United States Patent
Crouch et al.

(10) Patent No.: US 11,740,864 B2
(45) Date of Patent: Aug. 29, 2023

(54) METHOD AND SYSTEMS FOR PROVIDING CONTEXTUAL VISUAL AND AURAL FEEDBACK AND AWARENESS TO FLIGHT CREWS USING A VOICE ACTIVATED FLIGHT DECK

(71) Applicant: HONEYWELL INTERNATIONAL INC., Charlotte, NC (US)

(72) Inventors: Steven C. Crouch, Mesa, AZ (US); Chaya Garg, Plymouth, MN (US); Sudarshan Parthasarathy, Bangalore (IN); Naveen Nama, Warangal (IN); Robert DeMers, Elk River, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 34 days.

(21) Appl. No.: 17/198,701

(22) Filed: Mar. 11, 2021

(65) Prior Publication Data

US 2022/0101734 A1    Mar. 31, 2022

(30) Foreign Application Priority Data

Sep. 30, 2020 (IN) .............................. 202011042491

(51) Int. Cl.
| | |
|---|---|
| *G06F 3/16* | (2006.01) |
| *G06F 3/04812* | (2022.01) |
| *G06F 3/04817* | (2022.01) |
| *G08G 5/00* | (2006.01) |
| *B64D 45/00* | (2006.01) |
| *G06F 3/0482* | (2013.01) |

(52) U.S. Cl.
CPC ............. *G06F 3/167* (2013.01); *B64D 45/00* (2013.01); *G06F 3/0482* (2013.01); *G06F 3/04812* (2013.01); *G06F 3/04817* (2013.01); *G08G 5/0021* (2013.01)

(58) Field of Classification Search
CPC ... G08G 5/0021; G06F 3/167; G06F 3/04812; G06F 3/04817; G06F 3/0482; G06F 3/04842; B64D 45/00; B64D 43/00
See application file for complete search history.

(56) References Cited

U.S. PATENT DOCUMENTS

| | | | |
|---|---|---|---|
| 8,224,653 B2 | 7/2012 | De Mers et al. | |
| 9,432,611 B1 | 8/2016 | Nelson et al. | |
| 9,824,689 B1 * | 11/2017 | Shapiro | ................... G10L 15/22 |
| 9,830,910 B1 | 11/2017 | Shapiro et al. | |
| 9,922,651 B1 | 3/2018 | Nelson et al. | |

(Continued)

FOREIGN PATENT DOCUMENTS

| | | |
|---|---|---|
| EP | 3296989 A1 | 3/2018 |
| JP | 2010156825 A | 7/2010 |

*Primary Examiner* — Tan H Tran
(74) *Attorney, Agent, or Firm* — Lorenz & Kopf LLP

(57) ABSTRACT

A voice activatable flight deck system including a voice recognition and processing system for receiving and processing input voice commands and determining machine commands for the voice activatable flight deck system. The system provides indications as to whether user interface functional elements are voice command enabled, disabled or whether voice command input is not available. The system provides directional feedback to the voice command depending on whether a pilot in command or second in command issued the voice input.

14 Claims, 27 Drawing Sheets

(56) References Cited

U.S. PATENT DOCUMENTS

| | | | | |
|---|---|---|---|---|
| 10,150,425 | B1* | 12/2018 | Scalisi | H04R 1/323 |
| 11,102,578 | B1* | 8/2021 | Lindahl | G06F 3/04817 |
| 2006/0238511 | A1* | 10/2006 | Gyde | G08G 5/0021 |
| | | | | 345/168 |
| 2010/0153111 | A1* | 6/2010 | Hirai | G06F 3/0482 |
| | | | | 715/825 |
| 2011/0118908 | A1* | 5/2011 | Boorman | G08G 5/0021 |
| | | | | 701/14 |
| 2012/0300963 | A1* | 11/2012 | Rauch | H04R 25/453 |
| | | | | 381/315 |
| 2015/0382124 | A1* | 12/2015 | Hall | H04S 1/007 |
| | | | | 381/300 |
| 2016/0202872 | A1* | 7/2016 | Jang | G06F 3/033 |
| | | | | 715/728 |
| 2018/0357040 | A1* | 12/2018 | Spiewla | B60K 35/00 |
| 2019/0051298 | A1* | 2/2019 | Lee | H04M 1/72403 |
| 2019/0278552 | A1* | 9/2019 | Lyren | H04S 7/303 |

* cited by examiner

FIG. 6

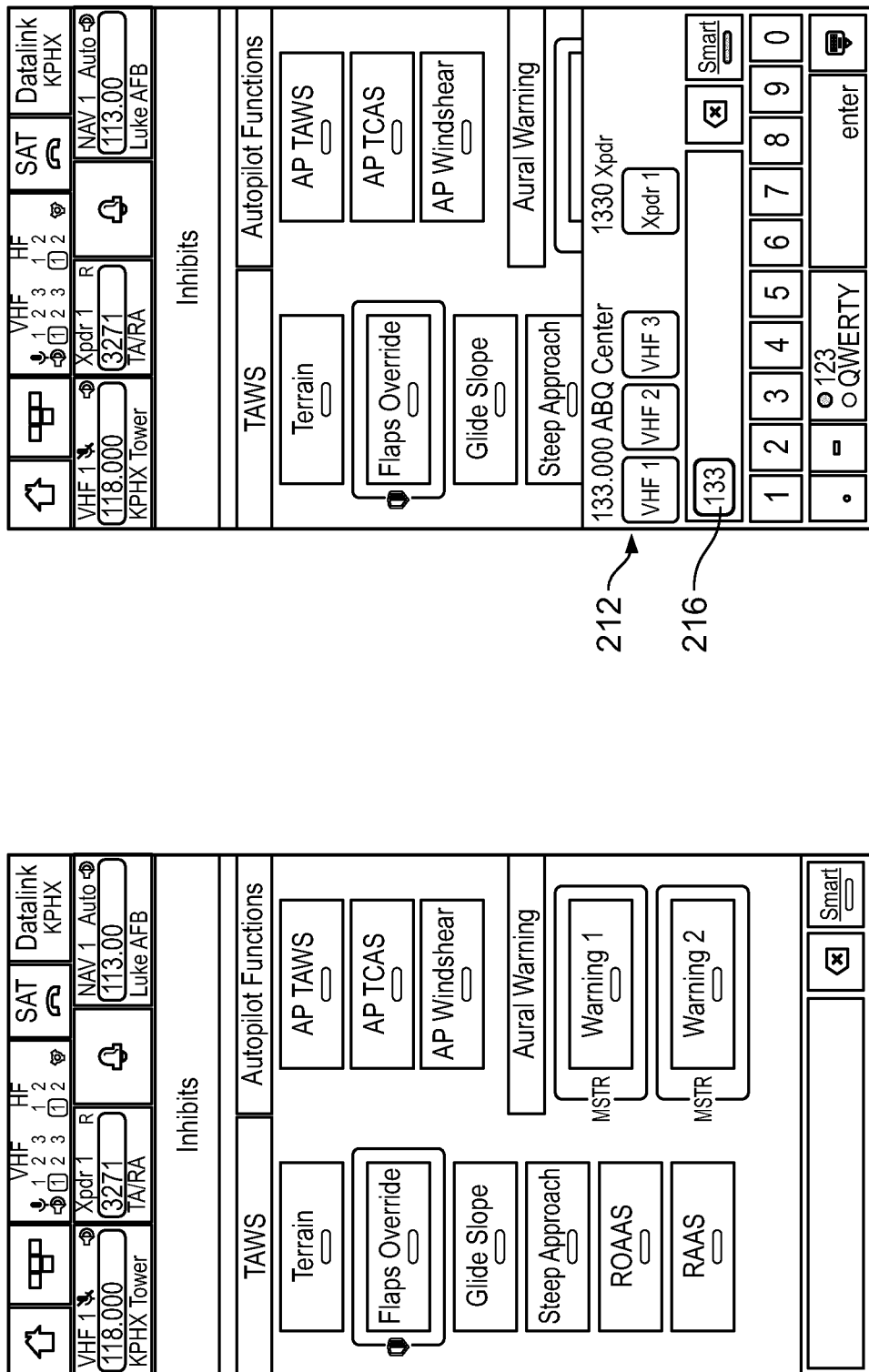

(a)

(b)

(c)

(d)

(e)

(f)

(g)

(h)

(i)

(j)

METHOD AND SYSTEMS FOR PROVIDING CONTEXTUAL VISUAL AND AURAL FEEDBACK AND AWARENESS TO FLIGHT CREWS USING A VOICE ACTIVATED FLIGHT DECK

CROSS REFERENCE TO RELATED APPLICATION

This application claims priority to Indian Provisional Patent Application No. 202011042491, filed, Sep. 30, 2020, the entire content of which is incorporated by reference herein.

TECHNICAL FIELD

The present disclosure generally relates to systems and methods for voice activated cockpits. More particularly, the present disclosure relates to user interfaces associated with voice command entry and system feedback.

BACKGROUND

Voice modality affords several advantages such as direct access to off-screen elements, reduced heads-down time etc., but also creates some crew situation awareness and Crew Resource Management (CRM) issues that need to be addressed.

In voice activated flight deck based applications, each side, i.e. the pilot side and co-pilot side, is equipped with equipment and means for the crew to command the flight deck using voice modality for performing certain flight deck functions. The pilot and co-pilot can independently and simultaneously use these voice activated features to perform their tasks. Desirably, a pilot will have awareness when the co-pilot is using voice commands to interact with systems on the flight deck, for example, so that they do not interrupt the co-pilot. Speech affords direct access to functions and selections, but it also eliminates the ability to create awareness of available/unavailable functions using visual design. Furthermore, 100% recognition accuracy cannot be guaranteed for Automatic Speech Recognition (ASR) engines such that there always exists the risk of false positives.

Hence, it is desirable to provide systems and methods for voice activated cockpits. More specifically, it is desirable to provide methods and systems that provide more advanced voice activation related functions, associated user interfaces and system feedback. In particular, it is desirable to intuitively provide a quick and easy means for the flight crew to review speech commands that were verbally spoken by a flight crew member (PIC or SIC), ensure the system correctly interpreted the spoken command, and either confirm the action or make a correction prior to instantiating the command. Yet further, it would be beneficial to provide awareness of the source of voice commands to help improve situational awareness and CRM. Additionally, it is advantageous to intuitively provide visual cues to the flight crew at either the window or function level of an application—or both—to determine whether voice modality can be used. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a first aspect, there is disclosed a voice activatable flight deck system and method. The system and method comprises a display device, a database including data on acceptable voice commands associated with functions or applications, and a voice recognition and processing system for receiving and processing input voice commands and determining machine commands for the voice activatable flight deck system. The system and method displays a user interface (UI) comprising a window and at least one functional UI element in the window through which a user is able to enter an input and displays, based on data from the database, graphical symbology on the UI indicating whether the at least one functional UI element and/or the window allow the user to enter an input by voice command using the voice recognition and processing system.

In another aspect, there is disclosed a voice activatable flight deck system and method for a cockpit of an aircraft. The system includes, and the method utilizes, a display device, speakers, and a voice recognition and processing system for receiving and processing input voice commands and determining machine commands for the voice activatable flight deck system. The system and method receive a voice command input to the voice recognition and processing system. The voice command input is from either a pilot in command positioned on a left side of the cockpit or a second in command positioned on a right side of the cockpit. The system and method determine visual and/or aural feedback to the voice command input. The system and method output the visual feedback through the display device and/or the aural feedback through the speakers. The visual feedback and/or the aural feedback is directional to indicate whether the voice command input is from the pilot in command positioned on the left side of the cockpit or the second in command positioned on the right side of the cockpit.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 6 depicts a graphical user interface, in accordance with an embodiment of the present disclosure;

DETAILED DESCRIPTION

Figure 1:
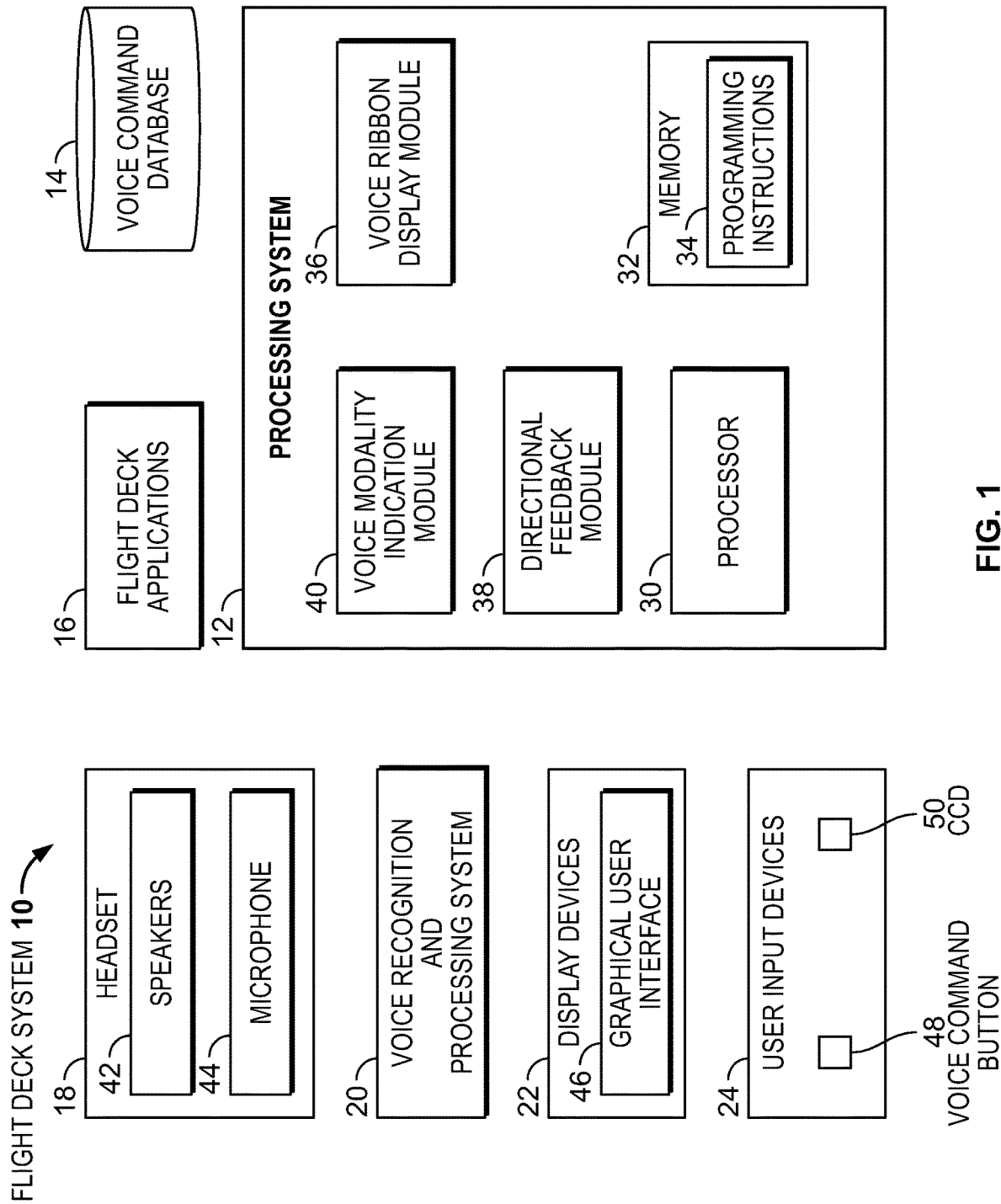
FIG. 1 depicts a flight deck system, in accordance with an embodiment of the present disclosure.
Figure 2:
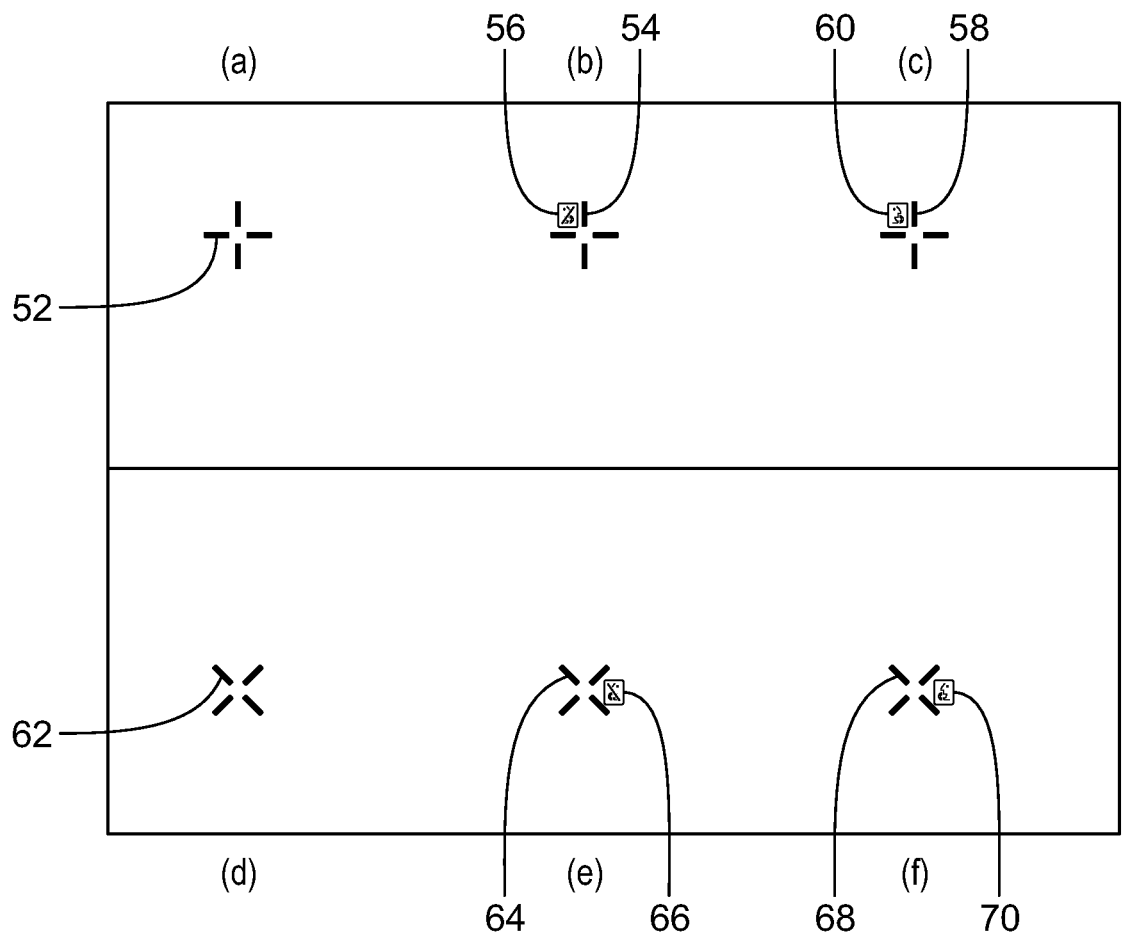
FIG. 2 depicts alternative cursors for indicating whether voice modality is available, in accordance with an embodiment of the present disclosure.
Figure 3:
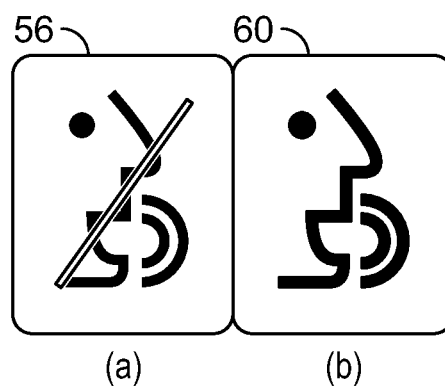
FIG. 3 depicts icons indicating whether voice modality is enabled or disabled, in accordance with an embodiment of the present disclosure.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

The present disclosure provides systems and methods relating to a voice activated flight deck. In particular, features are provided to enhance a user interaction with flight deck systems through voice activated commands. According to one aspect of the present disclosure, graphical symbology is displayed to indicate that a window application and/or function and/or element in the window application is voice-enabled. That is, the graphical symbology indicates whether functionality included in a user interface (UI) can be accessed, and data entered, using voice modality. In embodiments, the symbology distinguishes when voice modality is not applicable, is disabled and is enabled. The symbology may be provided adjacent a cursor (and thus be moved with the cursor). In one embodiment, the pilot (PIC) and first officer (SIC) may be provided with separate icon visualizations for their cursor control device (CCD). Additional symbology may be included with the cursor to distinguish when the voice modality is not available, is available but disabled and available and enabled and to differentiate whether the additional symbology relates to the SIC or the PIC. The additional symbology may be an icon. The icon may be different for the PIC and the SIC.

When either member of the flight crew (PIC or SIC) moves their CCD cursor to a window where voice modality is not available, the CCD cursor will appear in a default state, Which may follow a crosshair cursor for the PIC and a 45° rotated crosshair for the SIC without the additional symbology indicating voice activation is enabled or disabled. without the additional symbology indicating voice activation is enabled or disabled.

Voice modality can be enabled or disabled by the flight crew. This feature could be implemented to affect both crew members—enabling or disabling the voice modality for both at the same time—or it could be implemented so it can be enabled or disabled for either crew member independently.

When voice modality is disabled, the cursor can display additional symbology as either the PIC or SIC moves their respective cursor into a window and/or on top of a function or element in the window. This symbology conveys to the crew member that either the window or the function is currently disabled for use with the voice modality.

When voice modality is enabled, the CCD cursor can display additional symbology as either the PIC or SIC moves their respective cursor into a window and/or on top of a function. This symbology conveys to the crew member that either the window or the function is currently enabled for use with the voice modality.

In another embodiment, when voice modality is enabled, the system can also be configured such that either the PIC or SIC may click their respective cursor in a window, use a touch gesture with their finger(s) inside a window or use a voice command (such as "Show me speech enabled functions"; for example) to visually indicate which functions are currently enabled for use with the voice modality within the given window. Clicking or using a ouch based gesture in the window again—be it on a UI element or any negative space in the user interface—may dismiss the visual indications. They may also be set on a timer, which could automatically dismiss the indications after a few seconds. Different color outlines may be used to distinguish voice enabled functional elements and voice input disabled functional elements.

In another aspect of the present disclosure, systems and methods provide visual and/or aural feedback cues such that the Pilot and Co-Pilot can quickly and easily discern to which crew member system feedback to a voice activated command applies. In this way, the other crew member can ignore the feedback and continue their own workflow without distraction. In one embodiment, aural feedback (e.g. tones) are encoded to have different, unique tonal/pitch, note, and/or scale properties to differentiate between two crew members. The aural feedback is played using Head-Related Transfer Function (HRTF)—also commonly known as 3D Binaural Audio—such that aural feedback appears to be coming from a specific direction in 3-dimensional space. For example, an aural tone or sound coming from a nearby source will be higher in volume; whereas an aural tone or sound coming from a source farther away will be lower in volume. Similarly, a sound that is heard in the right ear is known to originate from the right side of a person and, conversely, a sound heard in the left ear is known to originate from the left side of a person. This is a sound localization technique, which can incorporate volume to provide distance, and stereo playback to provide spatial awareness. The sound localization technique can be provided to either the Pilot or Co-Pilot to aid each crewmember in discerning the aural feedback. Furthermore, this technique will enable the crew to subconsciously process the aural feedback notifications and subconsciously disregard the offside notifications minimizing the distraction due to irrelevant notifications.

In another embodiment, visual feedback provided to the crew includes at least one mechanism to help both the Pilot and Co-Pilot to discern for whom the system feedback is intended. One example visual feedback is such that visual cues are place-coded to display visually on either the left or right side of the display, thereby indicating which crew member initiated the voice command. Since the placement is relative to the crew members' seated position, it is primarily displayed in the peripheral vision of the crew member who issued the voice command, while still being noticeable to the other crew member but not in a primary view or distracting manner.

In an additional or alternative example, an icon used to provide the visual feedback will use a Left or Right annotation or an illustrated human face facing left or right to indicate to whom the visual feedback applies. The iconography will only require a quick glance and will not result in heads-down time or drain attentional cognitive resources from the pilot.

This mechanism to provide aural and/or visual feedback improves pilot situational awareness, crew resource management (CRM), and enhances the overall pilot experience. The present disclosure provides an application of HRTF/3D Binaural Audio for aural notifications to be perceived as "side specific" relative to seated cockpit position. Additionally or alternatively, unique attributes of visual feedback cues appear side specific such that no additional workload for discerning onside notifications from offside notifications, yet the offside notifications are accessible in specific scenarios when needed. The present disclosure further provides use of symbols/characters that are aligned with pilot position to indicate side specific use of speech.

In another aspect, the present disclosure provides systems and methods by which a crew member (PIC or SIC) issues a speech command to the system to tune a radio frequency (as an example application). In an embodiment, the system interprets the spoken command through a voice recognition and processing system, displays a visual readout of the spoken command for the crew to reference for accuracy, displays a series of UI controls related to radio tuning, such as intended airport code (if applicable), intended Frequency, intended radio (VHF 1, VHF 2, VHF 3/NAV 1, NAV 2,/ADF 1, ADF 2, Xpdr 1, Xpdr 2/etc), and displays soft button controls to either "cancel" the operation or "tune" the frequency (thus confirming the interpreted speech command was correct).

In one example, the system is useful to tune a radio when using a voice modality. The pilot may use a speech command and voice ribbon to tune a radio frequency on a radio and cancel the tune after reviewing what is displayed. In another example, the pilot speaks a command to tune a tower at an intended airport using an intended radio but without identifying the frequency. The system retrieves all available frequencies for that airport and radio and lists the possibilities for the pilot. The pilot can select, via CCD cursor or touch modalities, the "Frequency" dropdown menu to select the desired radio frequency from the list of available options. The pilot may also select a different radio from those available at the intended airport, "Cancel" the operation, or "Tune" the radio based on the selections. After selecting "Tune", the radio is tuned to new frequency according to the selections made.

In another example, the pilot uses a speech command and voice ribbon to tune a radio frequency on an intended radio. However, the intended radio is not currently displayed on the display unit's permanent radio bar display. Nevertheless, the voice ribbon pops into the user interface in response to the speech command. The pilot can select to tune the radio once the system understanding of the entered frequency and radio has been reviewed by the pilot. After the pilot selects the "Tune" soft control button, the intended radio is tuned to the desired frequency and, because the intended radio is not displayed in the underlying window, the pilot is provided with a visual notification to provide mode awareness. In some embodiments, a voice UI chiclet is provided in a data entry field in the user interface to allow a user to come back to a previous speech-based command and complete their task. The UI chiclet is visually distinguished depending on who issued the speech command. For example, the Voice UI chiclet may display a face symbol that faces a different way depending on whether a pilot on a left side of the cockpit spoke the command or a pilot on a right side of the cockpit spoke the command.

It is important to note that while the foregoing disclosure has focused on radio tuning, the voice ribbon disclosed herein could be applied to other functions as well wherein a user interface is used to interact with the flight deck.

FIG. 1 illustrates a flight deck system 10 including various voice modality features, in accordance with exemplary embodiments. System 10 includes, inter alia, a processing system 12, a voice command database 14, flight deck applications 16, a headset 18, a voice recognition and processing system 20, display devices 22 and user input devices 24 in a flight deck of an aircraft. System 10 enables voice command inputs, which are machine interpreted by the voice recognition and processing system 20, to various flight deck applications 16 including a radio application for controlling radio communications systems of the aircraft, a flight management system, and any other application that would benefit from data entry being facilitated by voice command input. The system 10 provides a predictive voice data entry function that has an intuitive selection and confirmation of the machine interpreted command, provides a graphical user interface (GUI) indicating where voice modality is available and further indicates in the GUI whether the pilot in command or the second in command has issued the voice command.

The system 10 includes a processing system 12 including a processor 30, memory 32, voice ribbon display module 36, directional feedback module 38, and voice modality indication module 40. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality. In an embodiment, the various modules are implemented by way of computer programming instructions 34 stored on memory 32 and executed by the processor 30. The memory 32 can include one or more computer-readable media, including, but not limited to, non-transitory computer-readable media, RAM, ROM, hard drives, flash drives, or other memory devices.

The voice ribbon display module 36 provides a voice data entry interface by which a voice ribbon including a plurality of data entry attributes is displayed, by which voice commands can invoke suggestions for associated data entry that are displayed in the voice ribbon and by which the machine interpreted data entry is embedded in selectable chiclets. The voice modality indication module 40 graphically indicates whether user interface functions and/or windows on the GUI allow voice modality data entry. That is, the display may include one or more functional UI elements that do not allow voice modality data entry, one or more functional UI elements for which voice modality is available but the user has disabled it and one or more functional UI elements for which voice modality is available and user enabled. The indication might be part of a graphical cursor on the GUI. The directional feedback module 38 provides visual and/or aural feedback to a voice command input that designates whether the pilot in command (PIC) or the second in command (SIC) issued the voice command.

The headset 18 includes speakers 42 and a microphone 44. The microphone converts the voice command uttered by the PIC or the SIC into an electrical or digital signal that can be analyzed and interpreted by the voice recognition and processing system 20. The speakers 42 include a left ear speaker and a right ear speaker that are held against or in the ears of the wearer. The speakers 42 receive audible feedback from the processing system 12 that may be directional, i.e. louder (or perceived to be louder) in one ear than the other ear to indicate an intended direction from which the sound issues.

The voice recognition and processing system 20 recognizes and translates spoken language into text and/or commands. Speech recognition software works by breaking down the audio of a speech recording (received from the microphone 44) into individual sounds, analyzing each sound, using algorithms to find the most probable word fit in that language, and transcribing those sounds into text. The voice recognition and processing system 20 includes speech recognition software that, in embodiments, uses natural language processing (NLP) and deep learning neural networks. The digital version of the audio signal is divided into small segments. The software matches these segments to known phonemes in the appropriate language. The program examines phonemes in the context of the other phonemes around them and determines what the user was probably saying and either outputs it as text or issues a computer command. The voice recognition and processing system 20 utilizes a voice command database 14 that includes a lexicon of commands and words associated with each of the various flight deck applications 16 and all of the commands and words that are compatible with a flight deck application. In one example, the voice command database 14 includes a lexicon of commands and words associated with radio tuning including radio name or identifier, frequency related words (e.g. numbers), airport identifiers and associated commands for a radio tuning application. The voice command database 14 includes acceptable voice commands and target functions/applications for those voice commands. This information from the database 14 allows the processing system 12 to determine when to display a cursor icon and/or a graphical highlight to indicate a UI functional element is speech-enabled.

The system 10 includes one or more display devices 22 including a navigation display, a primary flight display, an electronic flight bag (EFB), instrument panels and a digital scratch pad. The displays are operable to present graphical user interfaces (GUIs) 46 including lateral displays, vertical displays, out of window views and windows and functional UI elements allowing data and command entry. Exemplary graphical user interfaces 46 are described below with respect to the figures.

The system 10 includes user input devices 24 to provide additional data and command entry modalities to that of voice command via the microphone 44. In embodiments, the user input devices 24 include one or more of a keyboard (virtual or physical), joystick, multi-way rocker switches, mouse, trackball, touch screen, touch pad, data entry keys and/or any other suitable device. The user input devices 24 allow the user to enter commands and data into the system 10 so as to interact with the flight deck applications 16. The user input devices 24 include, in some embodiments, a voice command button 48, which may be a physical button or a soft button presented on a GUI 46. The voice command button 48 is pressed by the user to notify to the voice recognition and processing system 20 that a voice command or voice data entry input is coming from the microphone 44. The voice recognition and processing system 20 can analyze and machine interpret audio data only on request from the user by selecting the voice command button 48. Further, the user input devices 24 include a cursor control device 50 through which a cursor is moved in a GUI to allow position dependent selection of displayed functional UI elements.

The voice modality indication module 40 will be described in further detail with respect to the example embodiments of FIGS. 2 to 10. The voice modality indication module 40 is configured to determine whether a window and/or a functional UI element within a window is capable of receiving voice command or voice data entry input based on data included in the voice command database 14. The voice modality indication module 40 determines whether to display an icon and which icon to display depending on whether the data from the voice command database 14 indicates one of three possible states for the window or the functional UI element: voice command input is not available, voice command input is available but disabled and voice command input is available and enabled. Further, the voice modality indication module 40 is configured to provide the icons that are differentiated when associated with a cursor of the PIC and when associated with a cursor of the SIC. To do so, the voice recognition and processing system 20 may include metadata each returned machine interpretation of a voice command to indicate whether the voice command was uttered by the PIC or the SIC.

FIGS. 2(a) to 2(f) depict exemplary graphical cursors that are controlled by the cursor control device 50 and displayed on one or more graphical user interfaces 46. FIGS. 2(a) to 2(c) show versions of the cursor of the PIC that are adapted depending on whether a functional UI element collocated with the cursor are voice enabled. FIGS. 2(d) to 2(f) show versions of the cursor of the SIC that are adapted depending on whether a functional UI element collocated with the cursor are voice enabled. The cursor of the PIC follows a cross-hair sign shape in this embodiment, whereas the cursor of the SIC follows a cross hair shape that is relatively rotated to allow differentiation of whose cursor is shown in a GUI 46. The cursors of the PIC have three states representing voice modality is not available, voice modality is available but disabled and voice modality is available and enabled. In FIGS. 2(a) and 2(d), the cursors 52, 62 are indicating that the functional UI element does not allow voice commands or voice data entry by being plain cursors with no additional elements. In FIGS. 2(b) and 2(e) the cursors 54, 64 include an icon 56, 66 depicting that voice modality has been disabled for the functional UI element by the PIC or the SIC and/or depicting that voice modality is not available for the window application functional UI element. In FIGS. 2(c) and 2(f), the cursors 58, 68 include an icon 60, 70 depicting that the voice modulating for the UI functional element is both available and enabled for the user. The icons 60, 70 indicate that the PIC or the SIC can control the window and/or the functional UI element using speech modality. In some embodiments, the icon may be placed left of center of the cursor for the PIC cursor and right of center of the cursor for the SIC cursor to visually distinguish the cursor states for the PIC and the SIC. Additionally or alternatively, the icons may have a direction of facing or other directionality that is toward the right for the PIC and toward the left for the SIC. FIGS. 3(a) and 3(b) show enlarged versions of the icons 56, 60 for the PIC, which show right pointing simple faces having sound curves in front of the mouth. The voice modality disabled icon 56 is struck through whereas the voice modality enabled icon 60 is not struck through. The icons 60, 70 for the SIC also depict simple faces but the faces are looking to the left to assist with differentiating between the PIC and SIC icons. Other visually distinguishable icons could be used for differentiating voice disabled and voice enabled states and for differentiating the icons of the PIC cursor from the SIC cursor.

Figure 4:
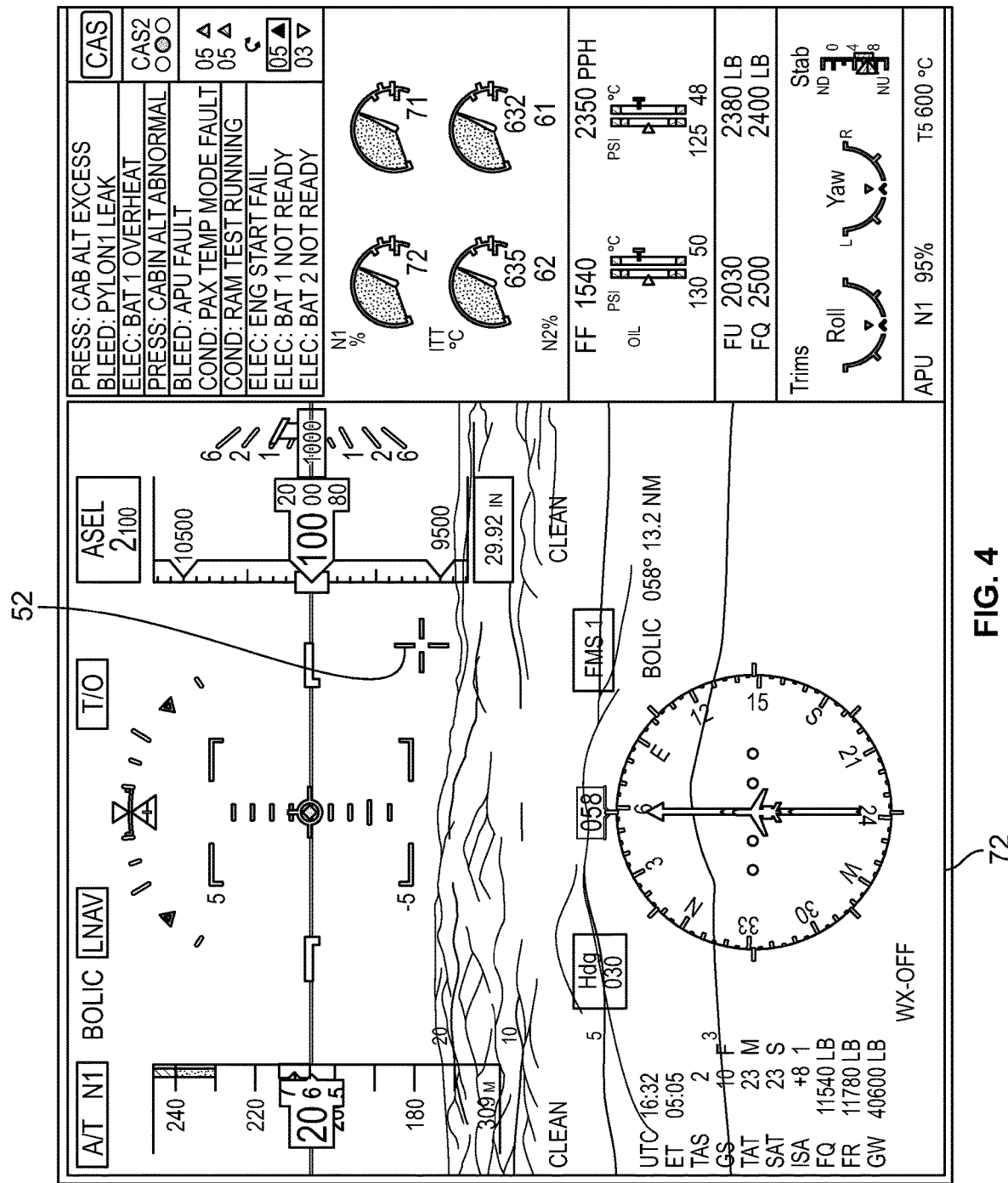
FIG. 4 depicts a graphical user interface, in accordance with an embodiment of the present disclosure.

FIG. 4 illustrates a window 72 on a GUI 46 of one of the display devices 22 showing a primary flight display, a crew alerting system and an engines display, in accordance with one example. The voice modality indication module 40 determines that voice modality is not available in the window 72 and displays the default version of the cursor 52, which does not include a voice modality icon.

Figure 5B:
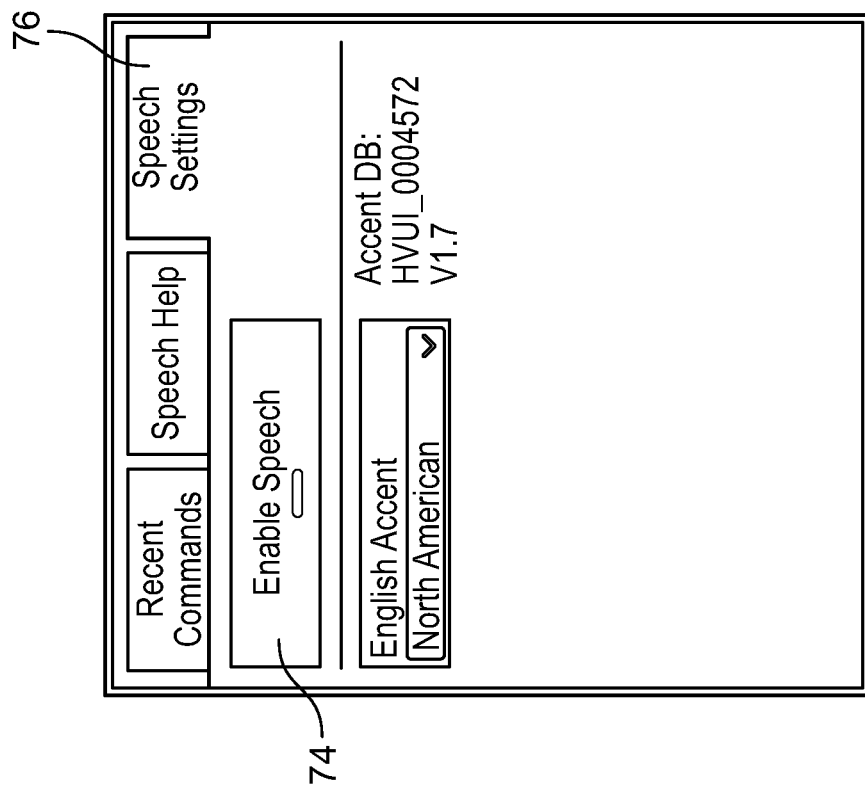
FIGS. 5(a) and 5(b) depict a settings user interface for disabling or enabling voice modality, in accordance with an embodiment of the present disclosure.
Figure 5A:
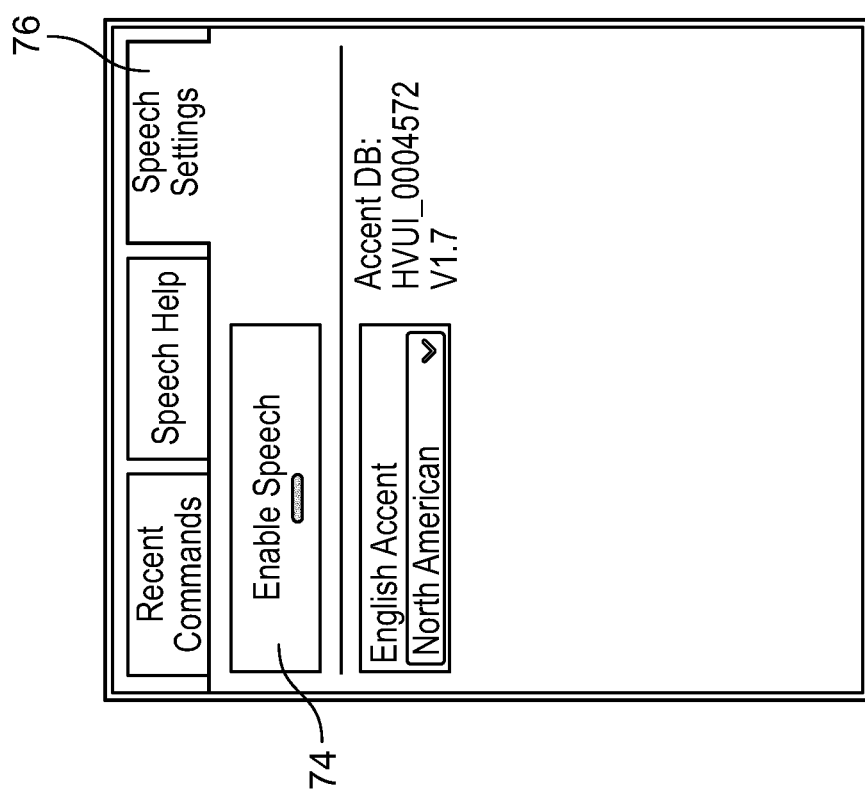

FIGS. 5(a) and 5(b) illustrate a GUI generated by the voice modality indication module 40 or another module associated with the respective flight deck application 16 to provide an interface by which the PIC or the SIC can disable voice modality for their side of the flight deck. In this example, the enabling and disabling of voice modality is for a whole application or for the PIC or SIC in general. However, a more granular enablement and disablement of voice modality is possible whereby particular windows or particular functional UI elements can be selectively enabled and disabled as to voice modality. In FIGS. 5(a) and 5(b), a speech settings menu 76 is displayed including a soft button for selectively enabling (FIG. 5(a)) and disabling (FIG. 5(b)) voice modality. The speech settings menu 76 is user dependent so that the PIC and the SIC can choose their own speech settings.

Figure 6:
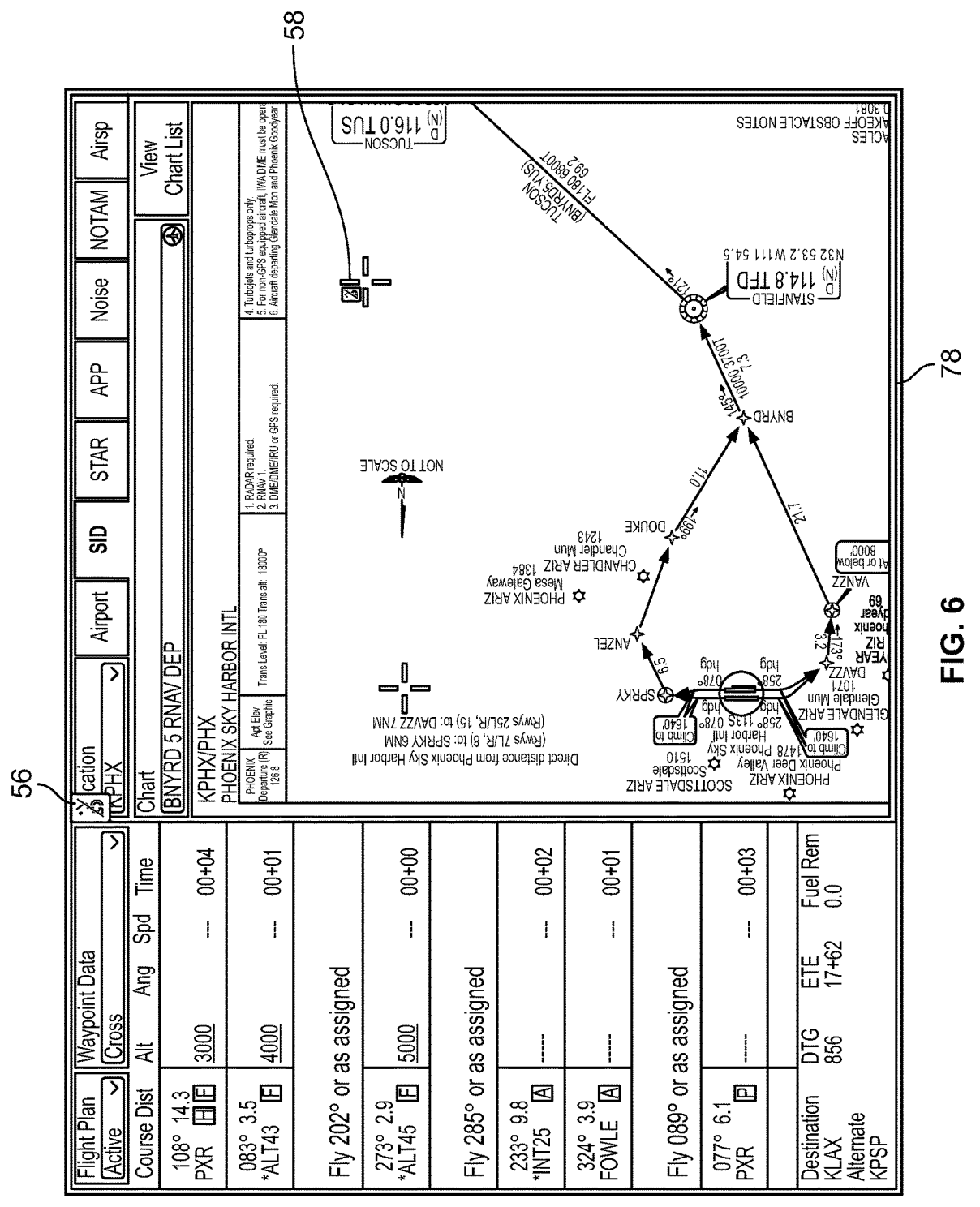

FIG. 6 illustrates a window 78 on a GUI of a multi-functional display (MFD) unit of the display devices 22. The voice modality indication module 40 determines that voice modality is available in the window 78 but voice modality is disabled for the user (PIC in this instance) associated with a cursor 58 in the window 78. The voice modality indication module 40 displays the version of the cursor 58 including the icon 56 indicating that voice modality is available and disabled. Additionally or alternatively to the icon being included in the cursor 58, the window 78 includes the icon 56 indicating that voice modality is disabled and available. The icon 56 is located in the top left corner of the window 78 for the PIC and in the top right corner of the window 78 for the SIC, in accordance with exemplary embodiments.

Figure 7:
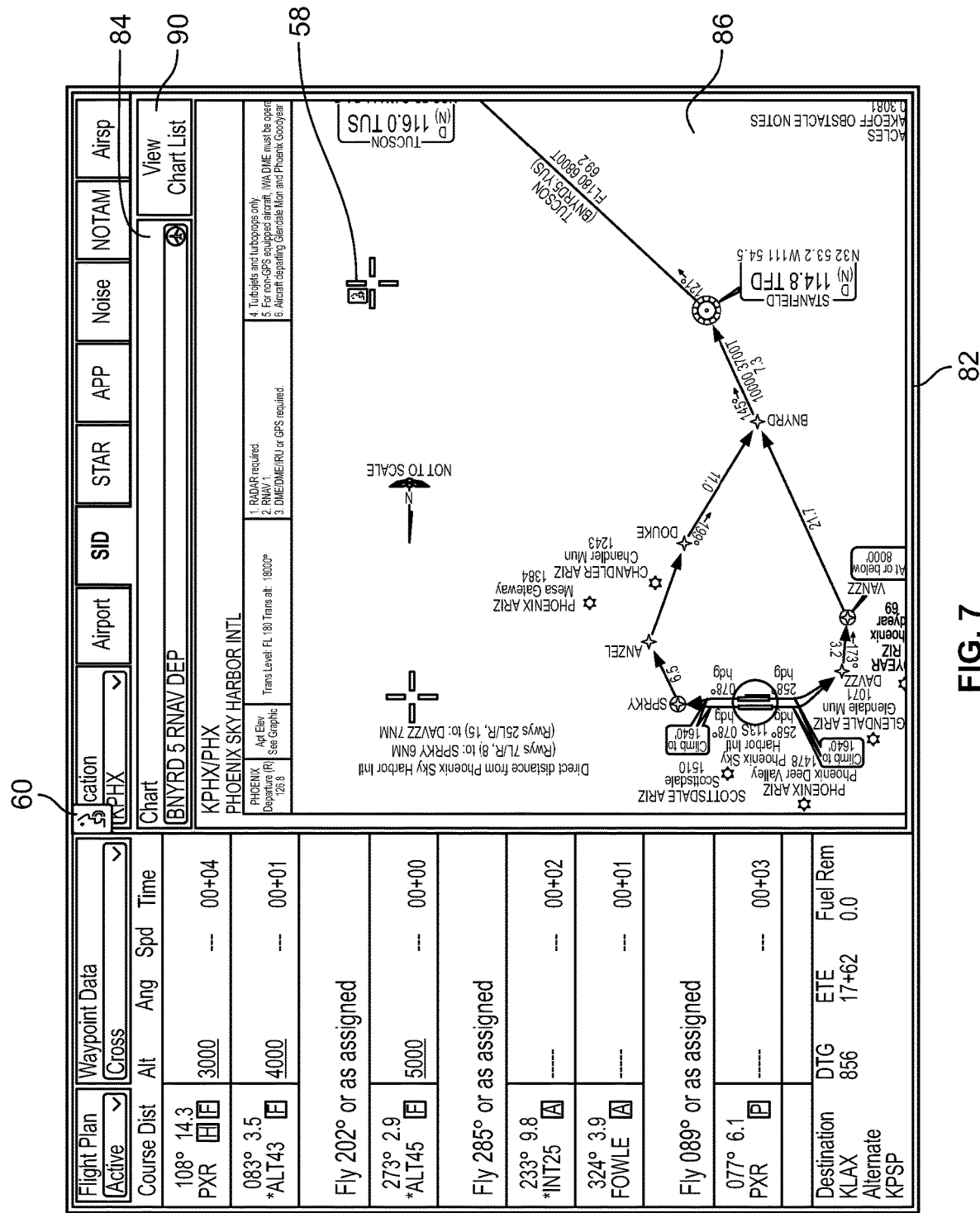
FIG. 7 depicts a graphical user interface, in accordance with an embodiment of the present disclosure.
Figure 8:
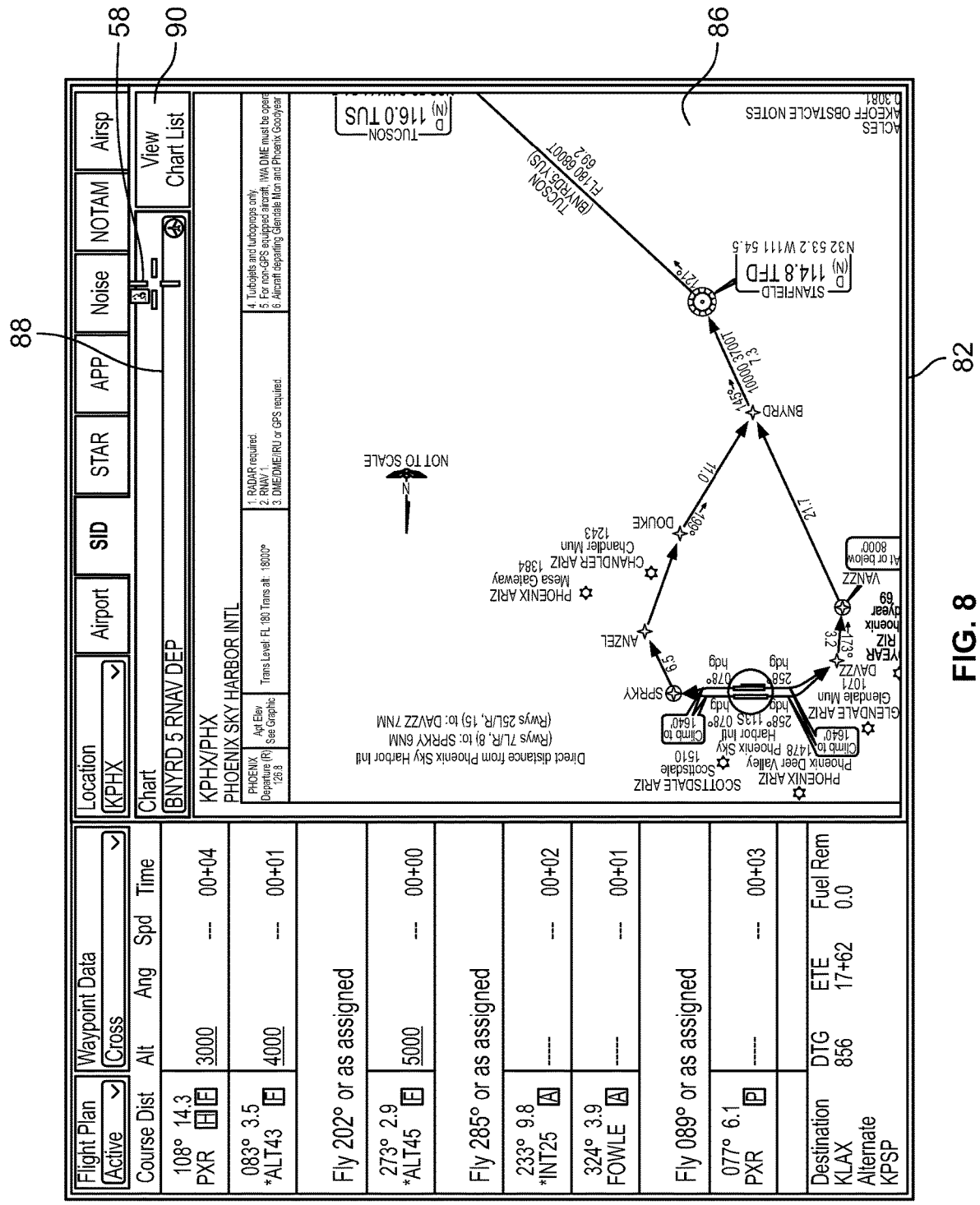
FIG. 8 depicts a graphical user interface, in accordance with an embodiment of the present disclosure.

In the example of FIG. 7, the GUI 46 for the MFD application (included in the flight deck applications 16) includes a window 82 including a plurality of functional UI elements 84, 86, 90. In this example, a first functional UI element 84 is a chart selection field, a second functional UI element is a chart area and a third function UI element 90 is a soft button to view a list of available charts. In FIG. 7, the cursor 58 is located over the first functional UI element 58 that is voice modality available and enabled for the entire application window. The voice modality indication module 40 displays the version of the cursor 58 including the icon 60 showing the status of voice modality available and enabled. The window 82 may additionally include the icon 60 indicating that at least one functional UI element in that window 82 has voice modality enabled and available. In the example of FIG. 8, the cursor 58 is placed over the second functional UI element 88, which is determined by the voice modality indication module 40 to be voice enabled and available. This figure depict that a specific UI element is voice enabled and available, but not the entire application window The cursor 58 includes the icon 60 indicating that voice modality is available and enabled. The third functional UI element 90 may not be voice available. In such a case, when the cursor is placed over the third functional UI element 90, the default version of the cursor (see cursor 52 in FIG. 3) would be displayed in the area of the third functional UI element 90 indicating that voice modality is not available.

Figure 26:
FIG. 26 depicts visual feedback for the status of a voice command at various stages, in accordance with an embodiment of the present disclosure.
Figure 26:
Figure 26:
Figure 26:
Figure 26:
Figure 26:
Figure 26:
Figure 26:
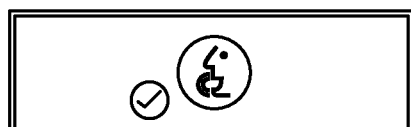
Figure 26:
Figure 26:

Referring to FIG. 26, various example visual feedback symbology are provided. The visual feedback allows different states in the processing of a voice command to be indicated. Thus, in FIGS. 26(a) and (b), the PIC or SIC has activated the speech system (e.g. using the voice command button 48) and the voice recognition and processing system 20 is listening for a voice command utterance. In FIGS. 26(c) and (d), the PIC is uttering a voice command and the symbology indicates such. In FIGS. 26(e) and (f), the symbology indicates that the voice recognition and processing system 20 is processing and interpreting a voice command. In FIGS. 26(g) and (h), the symbology indicates that the voice command was successful. In FIGS. 26(i) and (j), the symbology indicates that the voice command was unsuccessful. These different indicators improve status awareness of the processing of a voice command for a pilot.

Figure 9:
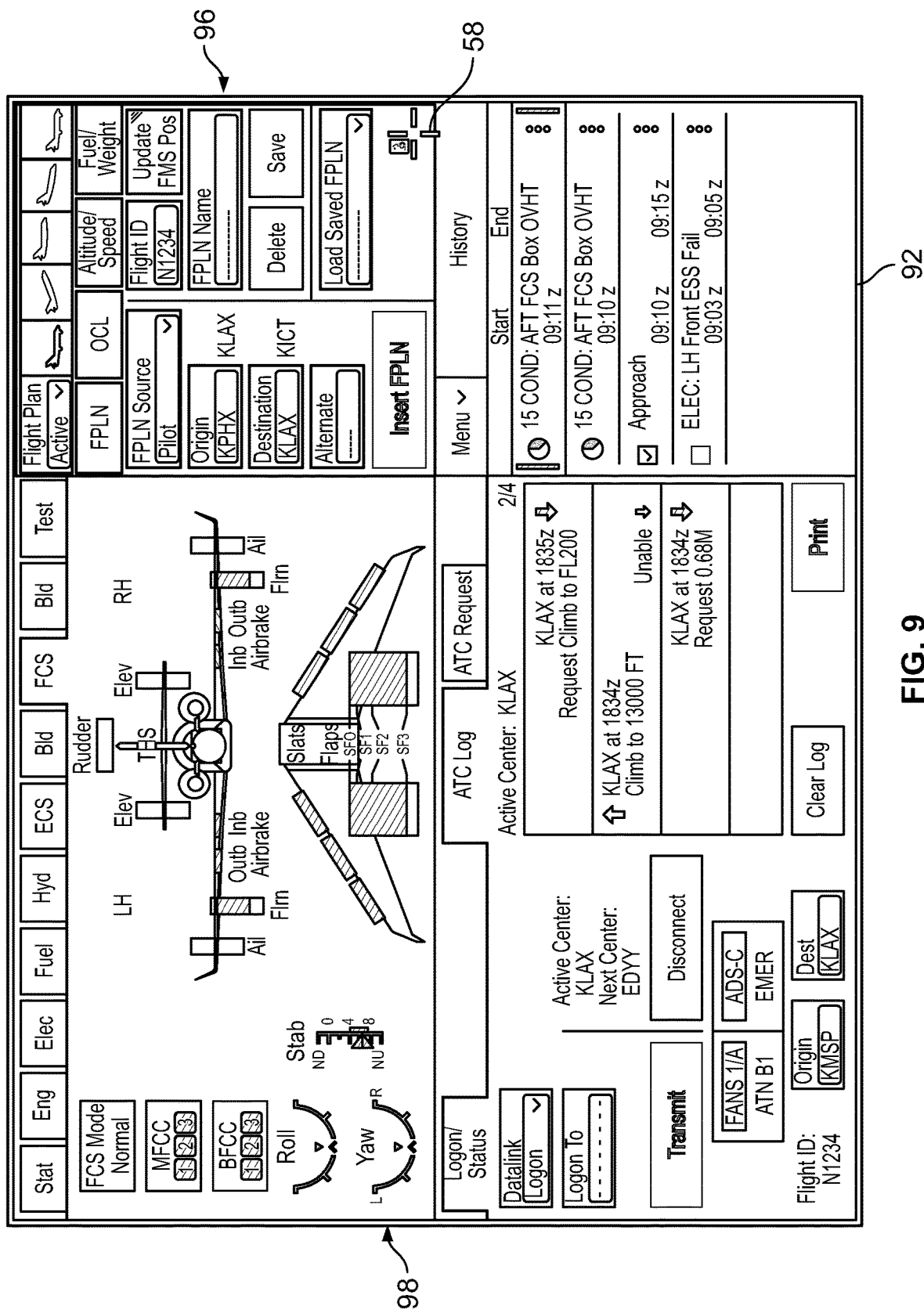
FIG. 9 depicts a graphical user interface, in accordance with an embodiment of the present disclosure.

FIG. 9 illustrates another exemplary embodiment in which a GUI 46 indicates whether voice modality is available and which of various functional UI elements have voice modality availability. The user may select an option, using one of the user input devices 24, to display all functional UI elements within a window that are voice modality enabled, thereby providing a snapshot summary for the user. The option might be selected by voice command, by operation of the CCD 50 or by touch based gesture, for example. The voice modality indication module 40 responds to the user request by including a visually differentiable identifier in association with each displayed functional UI element that allows voice command input and those which do not allow voice command input. In the example of FIG. 9, there is a cluster of functional UI elements 96 in the window 92 that have voice modality availability and these are highlighted (e.g. by distinctive colored outlining of each functional UI element 96) in a different way from the cluster of functional UI elements 98 that do not have voice modality availability. In the example embodiment, the cursor 58 includes the icon indicating that voice modality is available and enabled when the cursor 58 is placed over one of the functional UI elements in the cluster 96, although this additional indicator is not necessary in some embodiments. The highlighting to indicate which functional UI elements have voice modality available may be removed after a predetermined time (e.g. a few seconds) or it may be removed by user selection.

Figure 10:
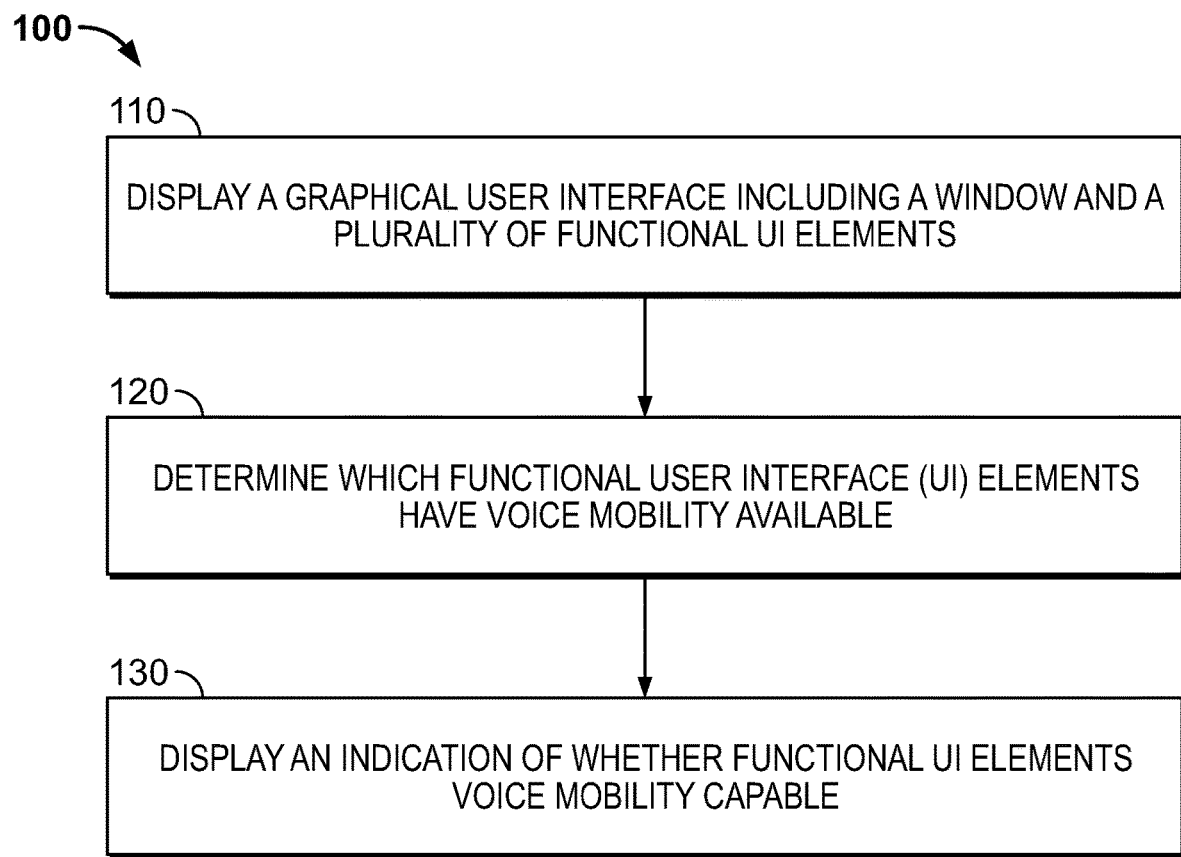
FIG. 10 depicts a flowchart of a method for indicating whether voice modality is available, in accordance with an embodiment of the present disclosure.

FIG. 10 depicts a flow chart of a method 100, in accordance with the present disclosure. The method is performed through the processing system 12, specifically the voice modality indication module 40 thereof. In step 110, a GUI 46 is displayed including a window and a plurality of graphical UI elements. The GUI 46 may be for a primary flight display (PFD) or an MFD and may be generated by PFD or MFD applications of flight deck applications 16. In step 120, a determination is made as to which functional UI elements have voice modality available based on data from the voice command database 14 describing functions and application that accept voice commands. In step 130, an indication is displayed of whether a functional UI element in the GUI 46 is voice modality capable. As has been described with respect to FIGS. 2 to 9, the indication can be included in association with the window, in association with a cursor and/or may indicate all displayed functional UI elements that are voice input capable. Step 130 may be responsive to a position of the cursor such that when the cursor is placed over a functional UI element that accepts voice commands, a version of the cursor is shown including an icon indicating voice mode availability, as has been described above. Step 130 may be responsive to a request entered by the user via a user input device 22 to display a snapshot of all functional UI elements that have voice modality capability. As has also been described above, the indication concerning voice modality may additionally differentiate whether voice modality is enabled or disabled as well as differentiating whether voice modality is available or not. Further, and as has also been described above, the indication (e.g. the icon) concerning voice modality may differentiate between the PIC and the SIC in addition to the PIC and the SIC having different cursor forms.

In accordance with another aspect of the present disclosure, the directional feedback module 38 determines whether a voice command comes from a PIC on a left side of a cockpit of the aircraft or from a right side of the cockpit of the aircraft. This determination can be made based on metadata reported by the voice recognition and processing system 20 with each machine interpreted voice command or data entry. The directional feedback module 38 provides aural and/or visual feedback to the machine interpreted voice command to enhance pilot awareness of the status of any of their own voice commands and those of the second in command.

Figure 11:
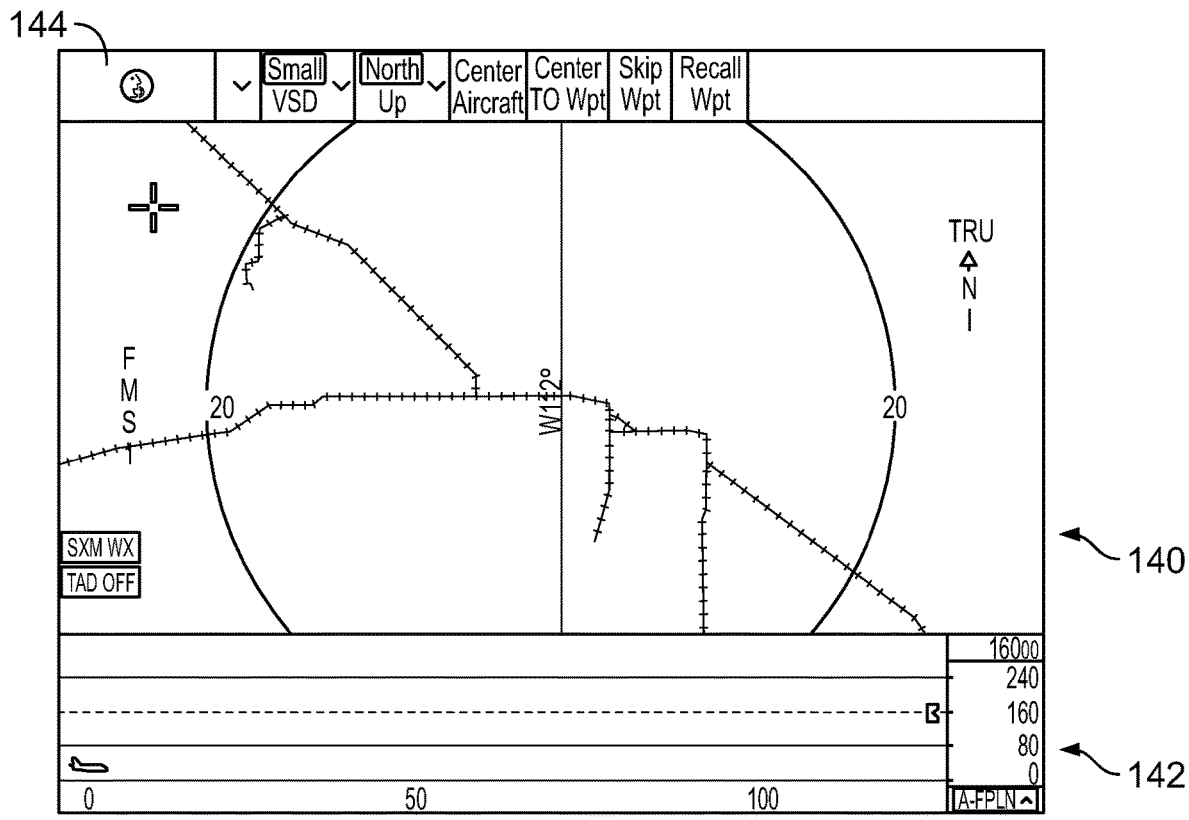
FIG. 11 depicts a display having a directional icon for indicating which pilot entered a voice command, in accordance with an embodiment of the present disclosure.
Figure 12:
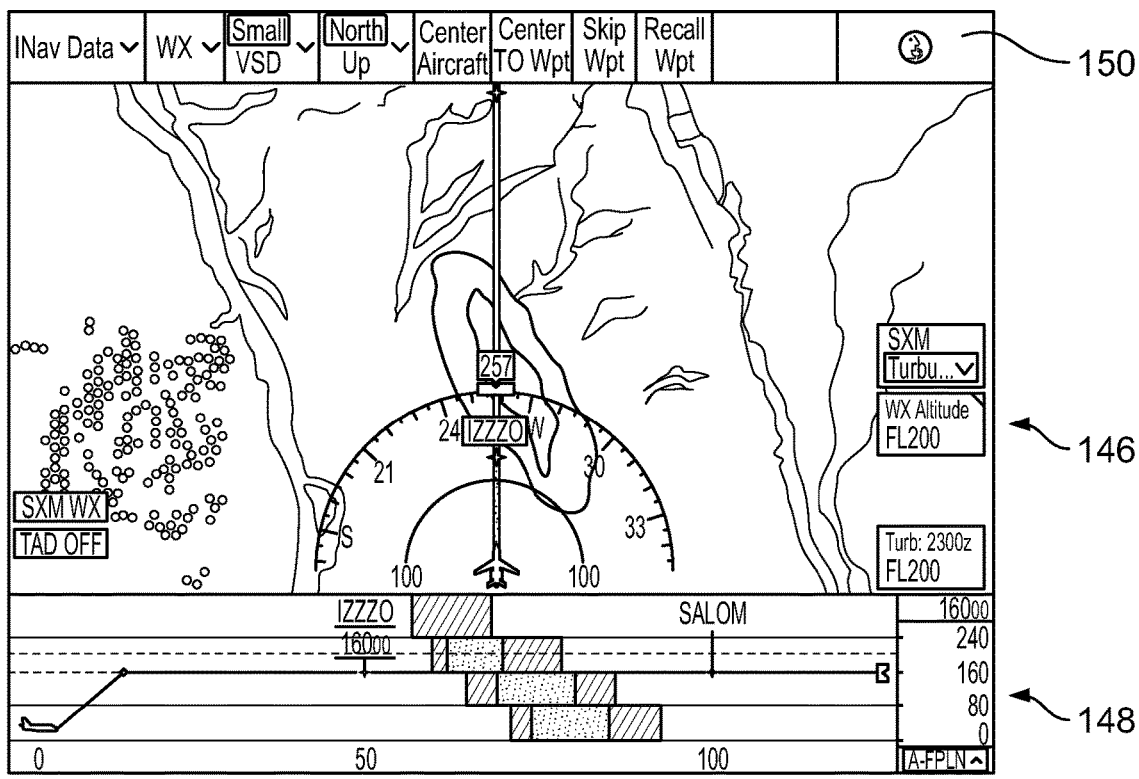
FIG. 12 depicts a display having a directional icon for indicating which pilot entered a voice command, in accordance with an embodiment of the present disclosure.
Figure 13:
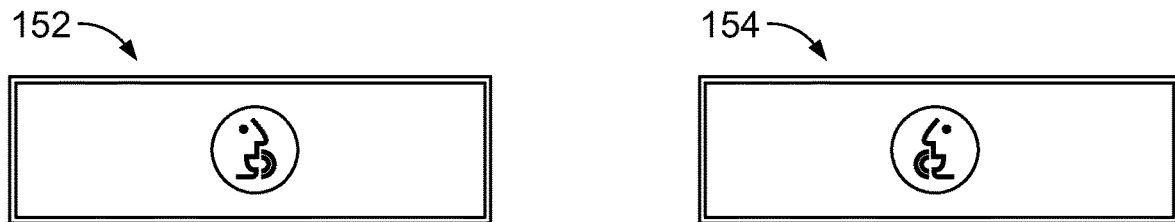
FIGS. 13 and 14 depict example directional icons, in accordance with an embodiment of the present disclosure.
Figure 14:

In FIG. 11, a lateral map 140 and a vertical situation display (VSD) 142 are displayed on a PFD of the display devices 22. In the example of FIG. 10, the PIC has issued a voice command and the voice modality indication module 40 has responded thereto by providing a visual indication 144 in the top left corner of the display to indicate that the PIC on the left of the cockpit has initiated a voice command, e.g. by pressing the voice command button 48. This provides place-coded visual feedback that the PIC is using voice modality and that any system feedback applies to the PIC. In the example of FIG. 12, the PFD includes another lateral map 146 and VSD 148. In this instance, the SIC has issued a voice command and the directional feedback module 38 has responded by including the visual feedback 150 in the top right corner of the display. FIGS. 11 and 12 indicate that the PIC or the SIC has initiated the voice system and the system is listening for a voice command to be issued. When a voice command is being uttered, the speech window will display some additional symbology/animation (a waveform, for example) to indicate that the PIC or the SIC is speaking. Once a voice command has been uttered, the symbology (icon) changes to display a progress bar to indicate the speech system is processing the spoken command, as will be described with respect to FIG. 26. Accordingly, the directional feedback module 38 positions visual feedback in a display to reflect the relative positions of the command issuer in the cockpit. The directional feedback module 38 provides visual feedback 144, 150 in the form of an icon. In the present embodiment, the icon is a simple line drawing of a face with speech waves coming from the mouth. The visual feedback may differ not only in position but in form depending on the command issuer. In the present example, the face in the icon of the visual feedback 144, 150 is facing right in FIG. 11 and left in FIG. 12, as can be seen more clearly by comparing the icon 152 for the PIC and the icon 154 for the SIC in FIG. 13. Another example is provided in FIG. 14 in which an L symbol is used for the icon 156 for the left positioned PIC and an R symbol is used in the icon 158 for the right positioned SIC. In this embodiment, the icons 156, 158 are simple microphone line drawings. Other iconographies to those illustrated in FIGS. 13 and 14 can be envisaged. Furthermore, although FIGS. 11 and 12 are provided in the context of lateral and VSD map applications, other display applications would benefit from directional visual feedback.

Figure 15:
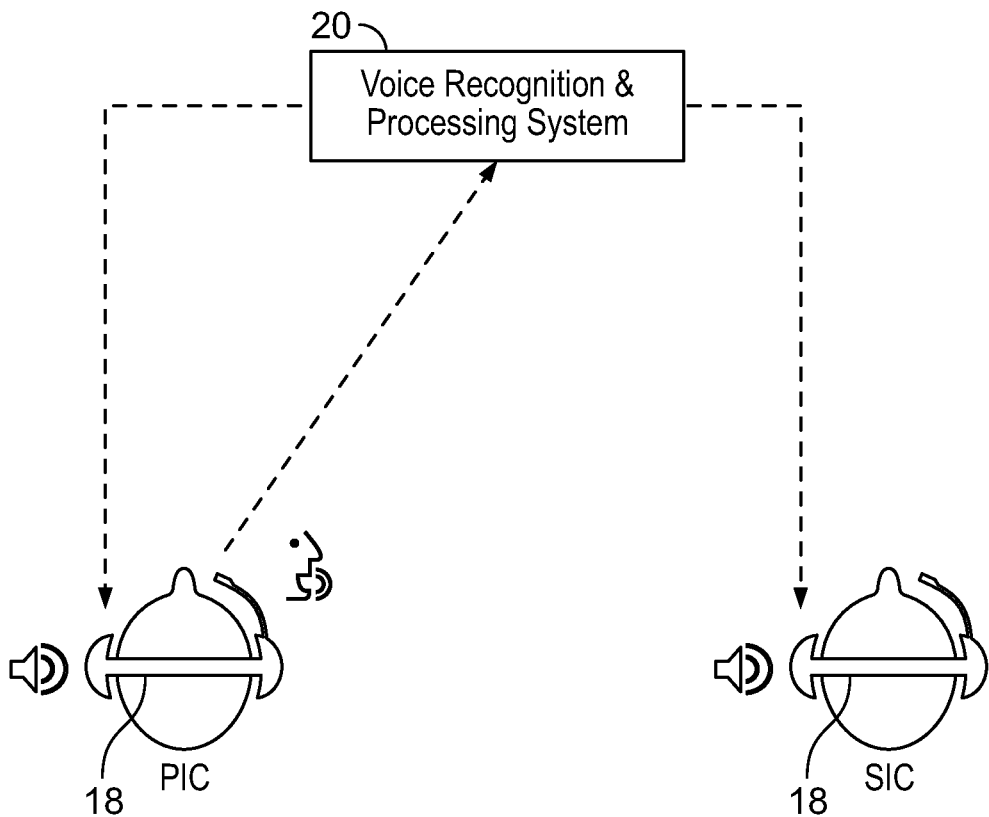
FIGS. 15 and 16 schematically depict directional aural feedback to indicate which pilot issued a voice command, in accordance with an embodiment of the present disclosure.
Figure 16:
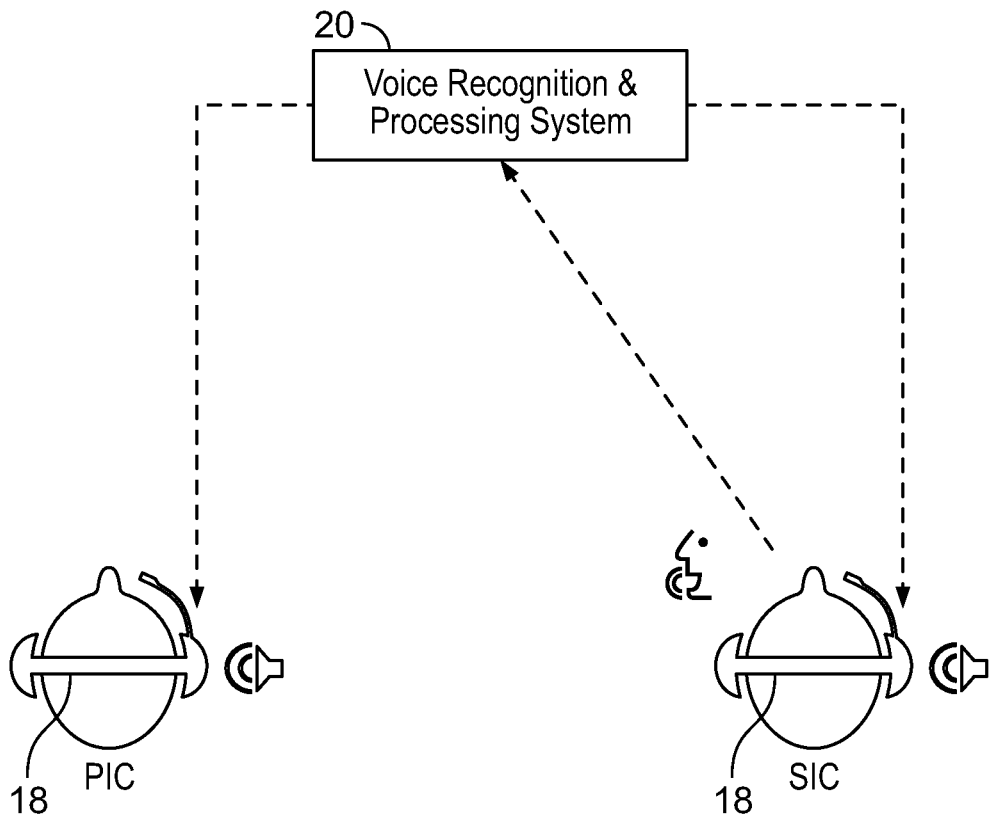

FIGS. 15 and 16 schematically depict aural feedback to a voice command provided by the directional feedback module 38. In the example of FIG. 15, a voice command is spoken by the PIC and the aural feedback from the directional feedback module 38 is played predominantly in the left speaker of the headphones of the headsets 18 for both the PIC and the SIC. In the example of FIG. 16, a voice command is spoken by the SIC and the aural feedback provided by the directional feedback module 38 is played predominantly in the right speaker of the headphones of the headsets 18 for the PIC and the SIC. In this way, the directional feedback module 38 applies a perceptible directionality to aural feedback to a voice command. The directionality could be by making the sound louder in one speaker of speakers 42 of the headset 18, e.g. by making the aural feedback sound substantially only in the speakers on one side of the headset 18 for the PIC and the SIC. The directionality could be provided by playing binaural audio and/or by making use of a Head Related Transfer Function (HRTF) to give the perception of directionality. The aural feedback may be an aural response that the voice command has failed or an aural response that the voice command has succeeded or a contextual aural feedback to the content of the voice command.

Figure 17:
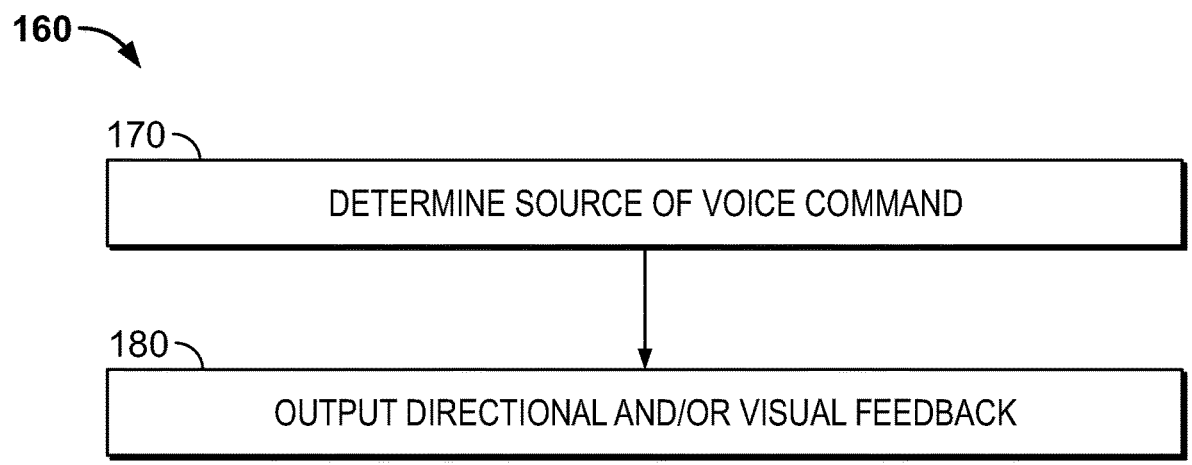
FIG. 17 depicts a flowchart of a method for indicating visually and/or aurally which pilot issued a voice command, in accordance with an embodiment of the present disclosure.

FIG. 17 illustrates an example method 160 for providing visual and/or aural feedback in response to a voice command that is directionally dependent on whether the PIC or the SIC uttered the voice command. The method 160 is carried out by the directional feedback module 38 of the processing system 12. In step 170, a determination is made as to whether the voice command is issued by the PIC or the SIC based on data identifying such from the voice recognition and processing system 20. In step 180, visual and/or aural feedback to the voice command is output through a display device 22 and/or speakers 42. The directional visual feedback may be the provided by the differing location of a voice icon and/or based on the form of the voice icon. The directional aural feedback may be provided by a perceptible localization of sound in the headsets 18 of the PIC and the SIC either biased to the left or to the right.

It should be appreciated that the directional feedback module 38, and its associated functions and methods, may be provided in combination with or independently from the voice modality indication module 40 and its associated functions and methods.

In another aspect of the present disclosure, the voice ribbon display module 36 receives machine interpretations of a voice command or data entry from the voice recognition and processing system 20 and generates a voice ribbon that allows editing and confirmation of the voice input. Chiclets may also be generated that embed a partially or wholly completed voice command that can be selected to execute the completed voice command or to continue to complete the partially completed voice command. The voice ribbon display module 36 is described in greater detail with respect to the embodiments of FIGS. 18 to 24 in the context of radio tuning. However other voice input capable flight deck applications 16 could similarly make use of the functions of the voice ribbon display module 36.

Figure 18B:
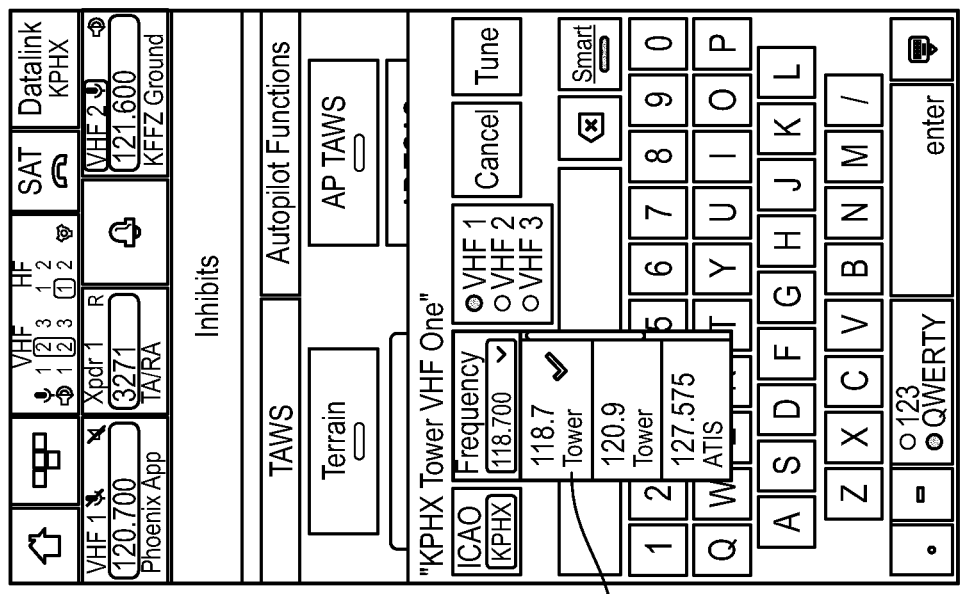
FIGS. 18(*a*) to 18(*d*) depict operational states of a user interface including a voice ribbon including values for attributes determined based on a voice command, in accordance with an embodiment of the present disclosure.
Figure 18A:
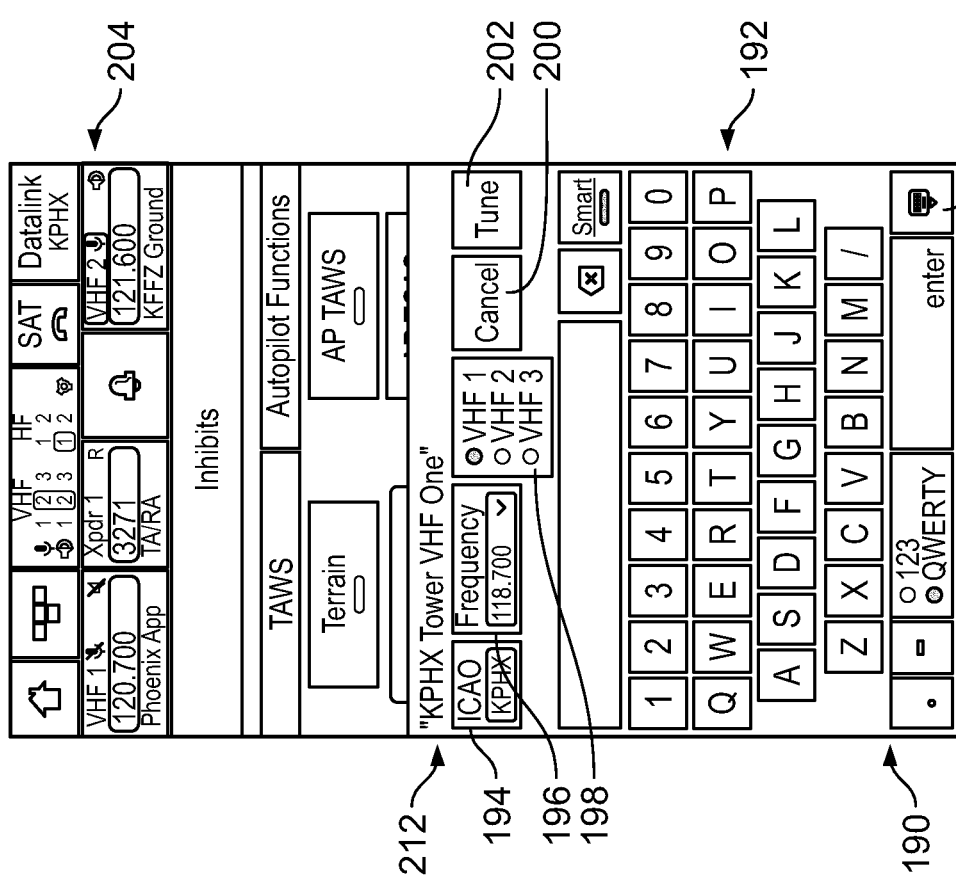

FIGS. 18(a) to 18(d) illustrate a GUI 190 of a digital scratch pad display device 210. Referring to FIG. 18(a), the GUI 190 includes a voice ribbon 212, a virtual keyboard 192 and a current status panel 204. The voice ribbon 212 includes a plurality attribute fields 194 to 198 that are generated in response to a machine interpretation of a voice command from the voice recognition and processing system 20 concerning one or more data entry inputs made by voice modality. In the present example of a radio tuning application, the plurality of attribute fields 194 to 198 include airport identifier field 194, frequency attribute field and radio identifier field 198. Other applications will have other data attribute fields. The voice ribbon 212 further includes a cancel button 200 to cancel the command to change the attributes of the flight deck application 16 and a confirmation button 202 (corresponding a tune button for a radio tuning application) to execute the changed data attributes described in the voice ribbon 212. In the present embodiment, the current status panel 204 displays the current values of attributes of the flight deck application. The virtual keyboard 192 provides the option to enter data through the keyboard to enter additional information to that entered by voice command or to edit the information entered by voice.

The voice ribbon display module 36 is configured to determine which flight deck application 16 is being commanded by the machine interpreted voice command. This can be determined based on the voice command database 14, which includes an association of voice commands and target applications. Further, values (numeric, identifiers, textual, etc.) of any data attributes spoken in association with the machine interpreted voice command identified. The voice ribbon 212 corresponding to the identified flight deck application is displayed values of data attributes are populated in the data attribute fields 194 to 198. Further, suggested values of data attributes or suggested further data attribute fields are included in the voice ribbon 212 for selection by the user. The suggestions are made based on the contextual information of the machine interpreted voice command and the values of any data attributes and optionally further contextual information that can be obtained from any of a number of flight deck applications 16 such as the current location of the aircraft, the flight plan and aircraft/airport hardware information. The suggestions may be made by the flight deck application, the voice ribbon display module 36 or a combination of both.

Figure 18D:
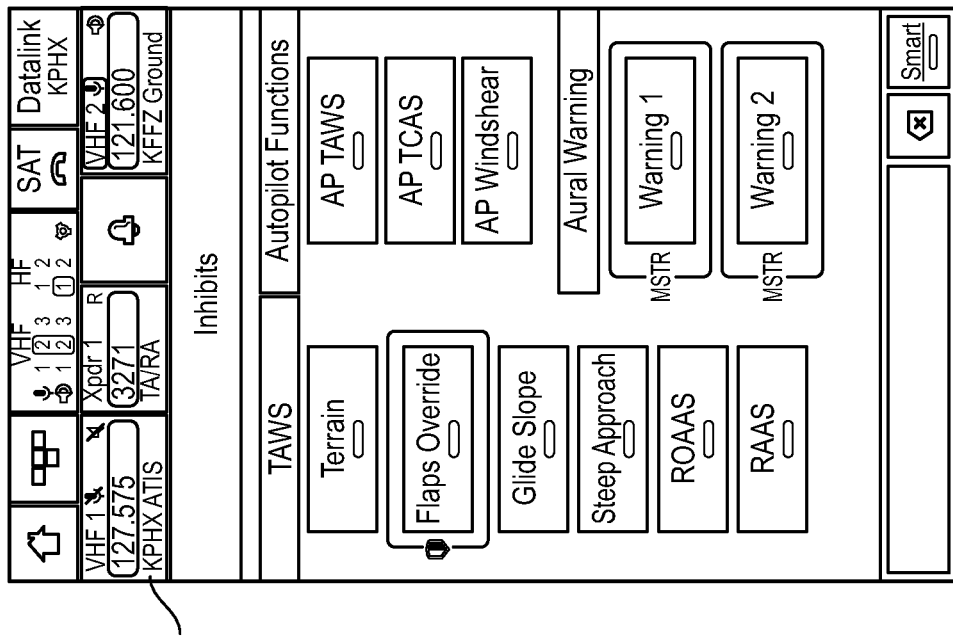
Figure 18C:
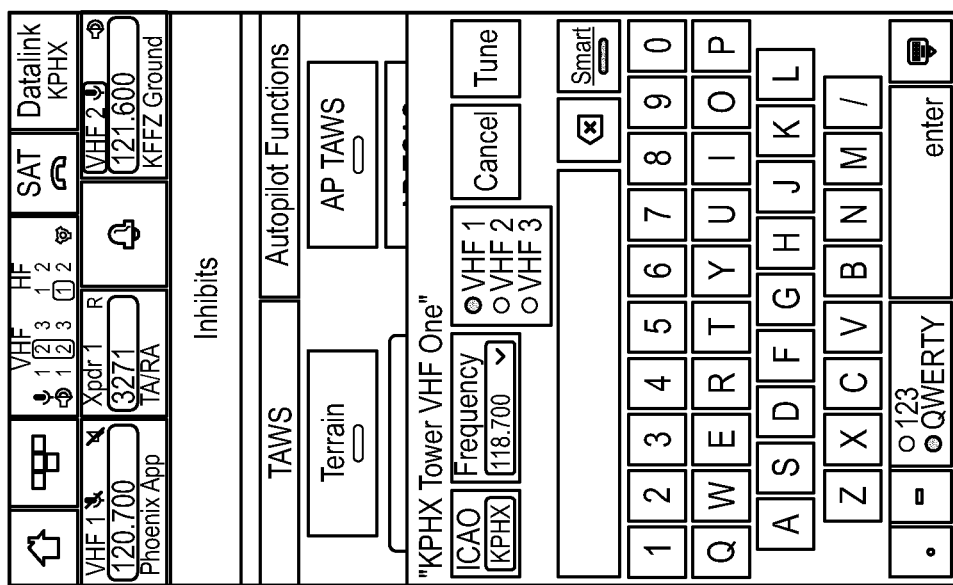

In the example of FIGS. 18(a) to 18(d), the pilot has spoken the voice command "KPHX Tower VHF One". The voice ribbon display module 36 is able to look up the flight deck application associated with a command for, for example, VHF1, namely the radio tuning application by using the voice command database 14. Further, the radio tuning application can determine suggestions for data attributes associated with the entered command, namely frequency based on contextual information included in the machine interpreted voice command and other contextual information. In particular, the radio application can suggest one of a plurality of frequencies associated with the KPHX Tower for VHF1 based on radio information included in a database for the radio tuning application. More particularly, the database can specify which frequencies are applicable for that tower and radio type. Similarly, the radio tuning application can retrieve plural radio identifiers associated with VHF1 in the database. In this way, the voice ribbon 212 includes the entered value for the airport identifier attribute field (KPHX) 194, a list of suggested values for the frequency attribute field 196, the entered value for the radio identifier field 198 and an associated list of suggested values. In FIG. 18(b), the user selects (using a user input device 24 such as touchscreen or the CCD 50) the frequency attribute field 196 to open a drop down menu of suggested frequency values. In FIG. 18(c), the commanded value (VHF1) for the radio identifier field 198 is displayed in association with a list of other suggested values, namely VHF2 and VHF3. The user selects to tune the values for each attribute field by pressing the soft confirmation button 202, which is sent to the radio tuning application for execution. In FIG. 18(d), the current status panel 208 has been updated to reflect the executed radio tuning in result field 208.

Figure 19B:
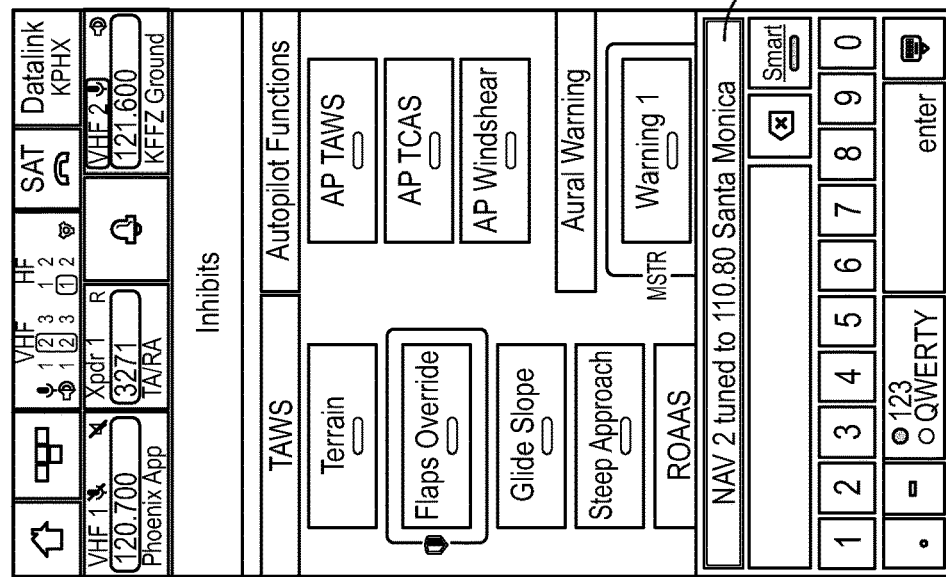
FIGS. 19(*a*) and 19(*b*) depict operational states of a user interface including a voice ribbon including values for attributes determined based on a voice command, in accordance with an embodiment of the present disclosure.
Figure 19A:
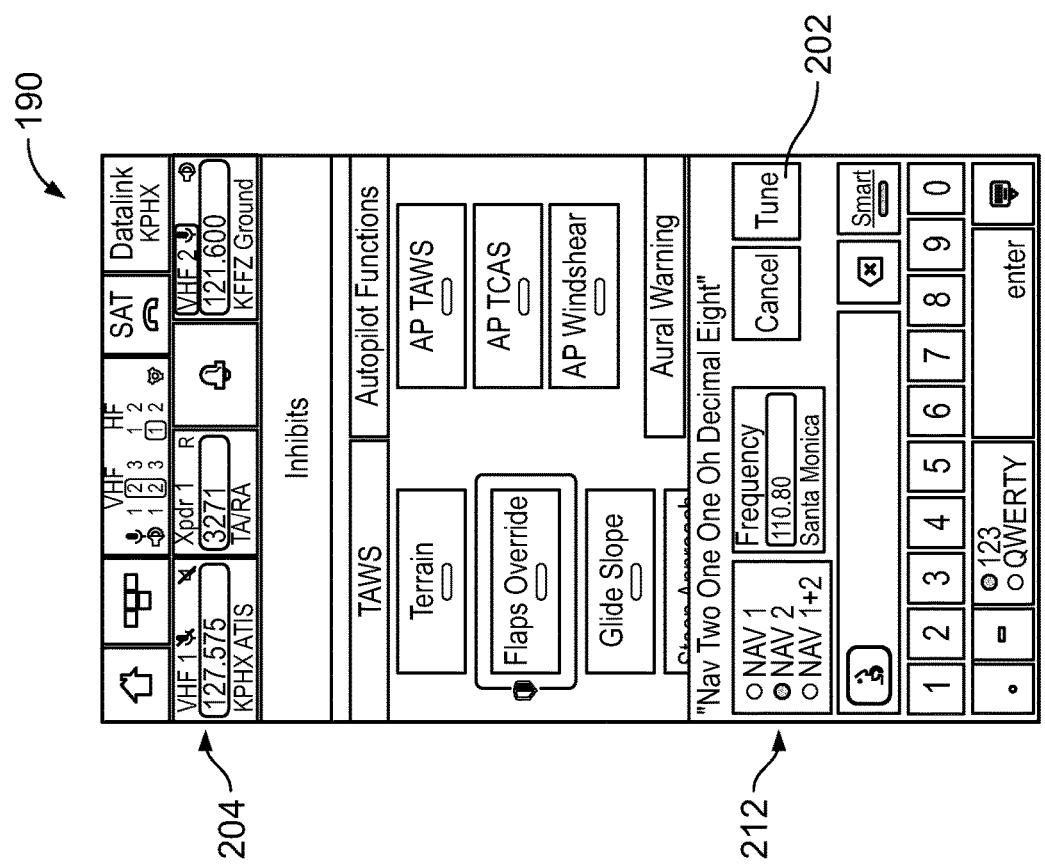

In the example of FIG. 19(a), the pilot has spoken a voice command "Nav Two One One Oh Decimal Eight". The voice ribbon display module 36 displays the voice ribbon 212 including the commanded value for the radio identifier (NAV 2) and the commanded frequency (110.80) and also suggested values for the radio identifier (NAV 1 and NAV 1+2) which can be selected by the user to toggle between the values. The voice ribbon 212 is loaded even though the GUI 190 was not previously displaying the radio identifier NAV. That is, the user can enter an attribute for an instrument without having to navigate to a user interface including information on that instrument (e.g. a current status in the current status panel 204). After the user has selected the confirmation button 202, the commanded and selected value for the radio attributes are sent to the radio tuning application for execution. Since the current status panel 204 does not display the value for the current status of the entered value for the radio identifier, a notification banner 214 is displayed in FIG. 19(b) to provide visual confirmation to the user of the executed tuning operation.

Figure 21B:
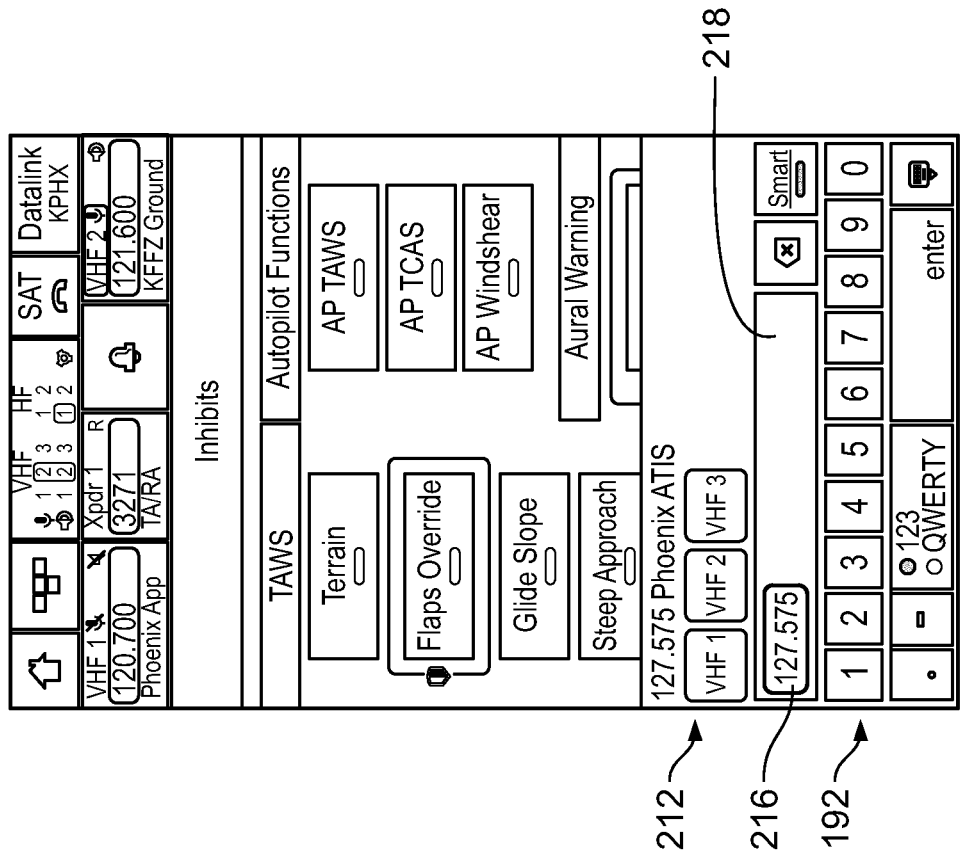
FIGS. 21(*a*) to 21(*c*) depict operational states of a user interface including a voice ribbon including values for attributes determined based on a voice command, in accordance with an embodiment of the present disclosure.
Figure 21A:
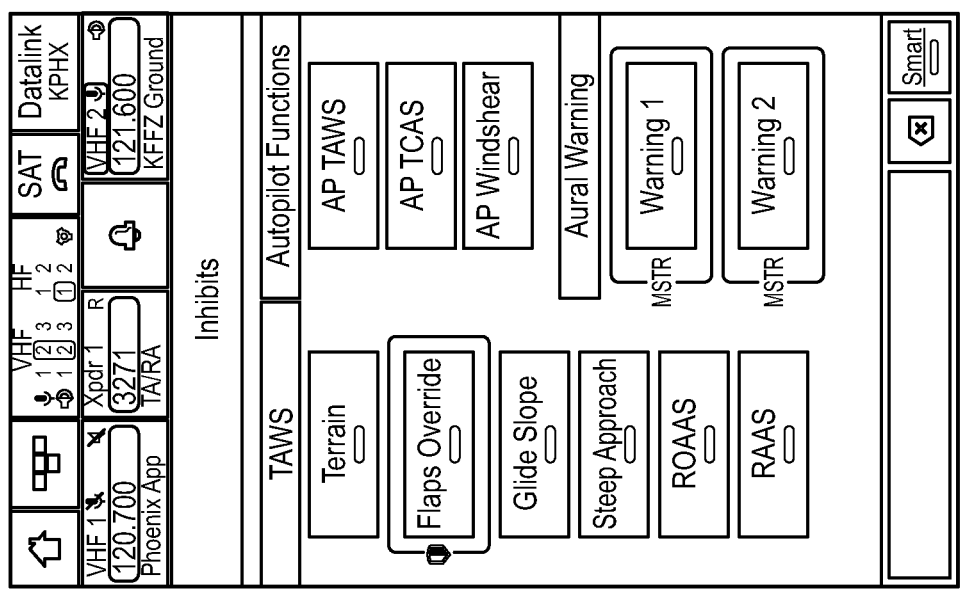
Figure 22A:
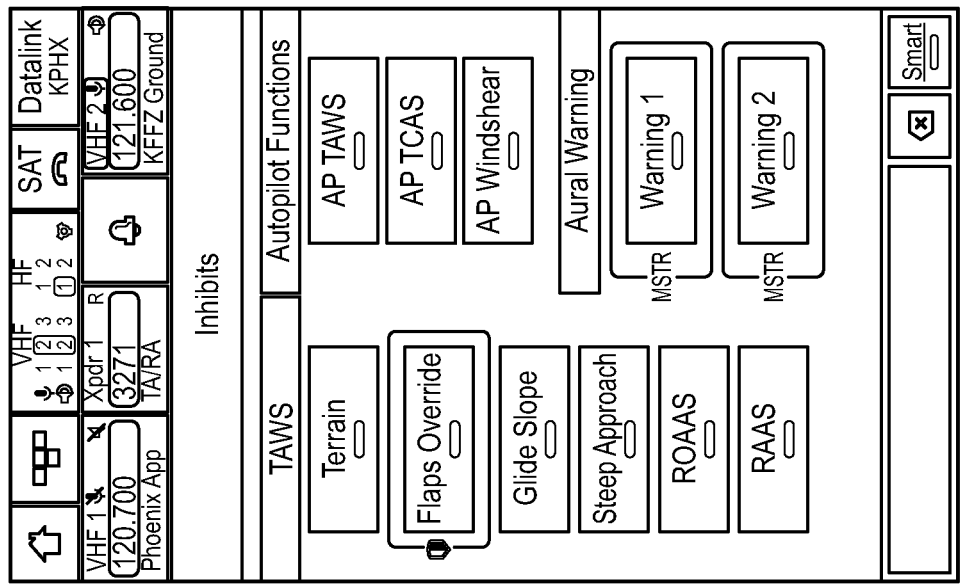
FIGS. 22(*a*) to 22(*d*) depict operational states of a user interface including a voice ribbon including values for attributes determined based on a voice command, in accordance with an embodiment of the present disclosure.
Figure 21C:
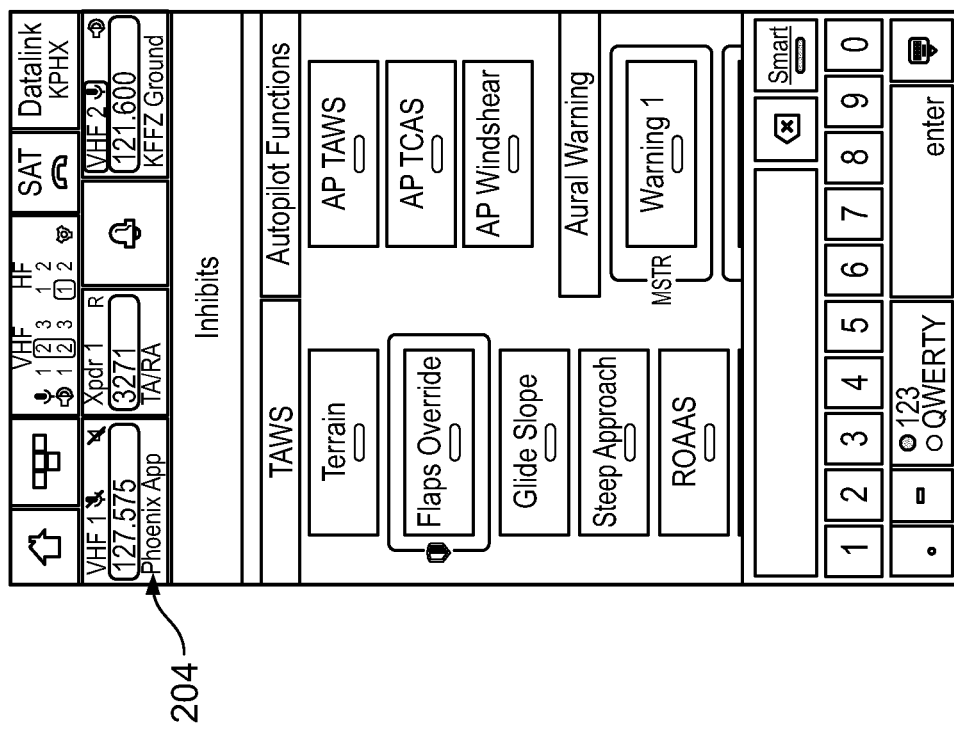
Figure 22C:
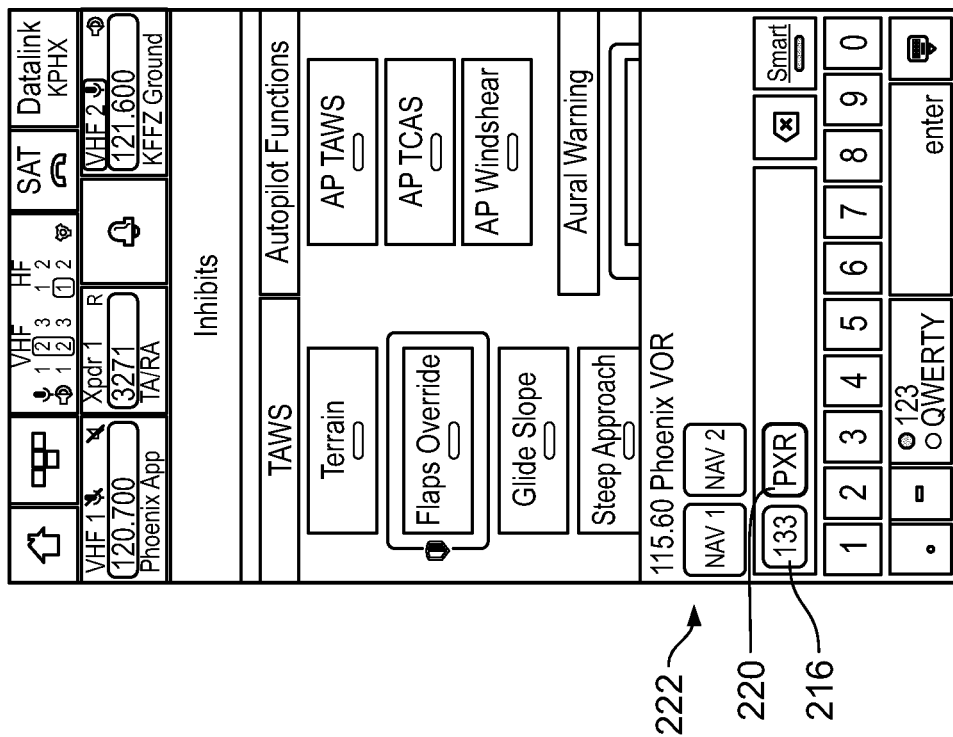
Figure 22B:
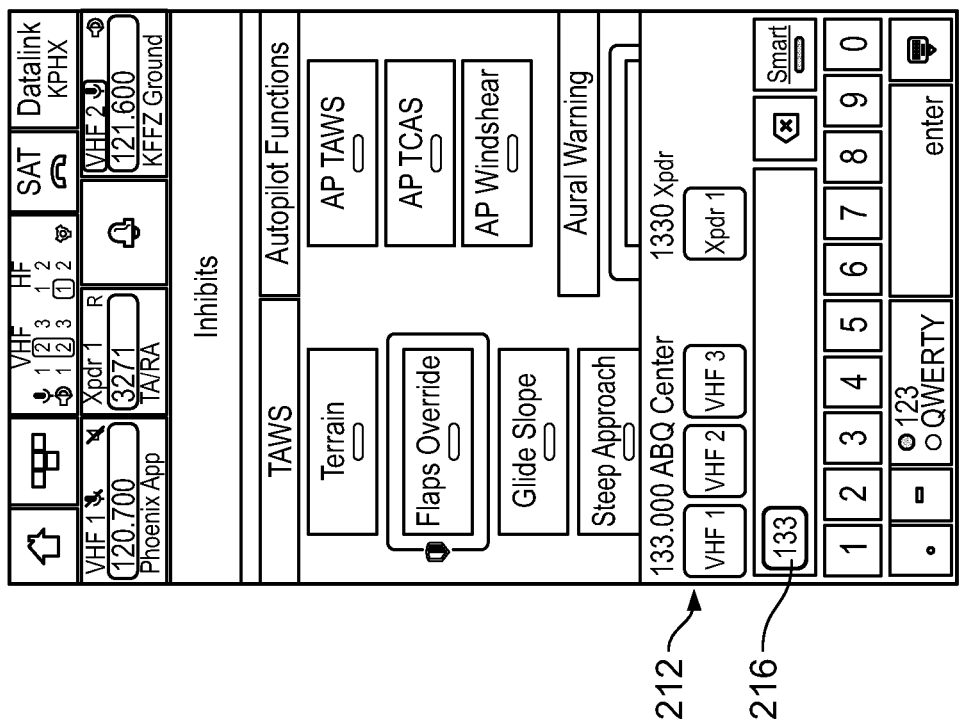

Another example of voice commanded radio tuning is described with respect to FIG. 21. In FIG. 21(a), the pilot commands "VHF One Twenty Seven Decimal Five Seven Five". The voice command is machine interpreted by the voice recognition processing system 20 and the machine interpretation is sent to the voice ribbon display module 36. In FIG. 21(b), the voice ribbon display module 36 displays available radio identifiers VHF1, VHF2 and VHF3 in a voice ribbon 212 along with the machine interpreted frequency value. The user is able to select one of the list of radio identifiers in the voice ribbon 212 using the user input device 24. The list of radio identifiers may not necessarily be included in a drop down menu, as shown. In the present embodiment, the voice ribbon display module 36 generates a chiclet 216 that embeds the response of the voice ribbon display module 36, specifically the machine interpreted and suggested values for the various attributes. This chiclet 216 allows a user to move to a different task and is selectable to re-open the voice ribbon 212 data embedded in the chiclet 216. The chiclet 216 is included in a data entry field 218, which is positioned above the virtual keyboard 192 in FIG. 21(b). From the list of selectable radio identifiers in the voice ribbon 212, the desired radio identifier VHF 1 may be selected by the user. In FIG. 21(c), the newly tuned radio frequency is displayed in the current status panel 204, optionally after the user has selected a confirmation button.

Yet another example of voice commanded radio tuning is described with respect to FIG. 22. In FIG. 22(a), the pilot commands "VHF One One Thirty Three", which is machine interpreted by the voice recognition and processing system 20. The voice ribbon display module 36 determines that a radio application is being commanded based on the machine interpreted command. The voice ribbon display module 36, or the invoked radio application, suggests possible radio identifiers associated with the value for the radio frequency. That is, the frequency value is used as a search parameter for a radio tuning database, possibly in association with other contextual information like current location and destination airport derived from the flight plan, to determine a plurality of possible radio identifiers that operate with a frequency beginning 133, which returns the suggestions VHF1, VHF2, VHF3 and XDPR1. Each of these suggestions are included in a selectable widget displayed in the voice ribbon 212 as shown in FIG. 22(b) or the list of suggestions could be included in a drop down menu. Further, the voice ribbon 212 determined by the voice ribbon display module 36 is embedded in a chiclet 216. In the present example, the pilot moves to another voice command task and utters "Papa Xray Romeo Nav One". The voice recognition and processing system 20 machine interprets the command and the voice ribbon display module 36 displays another voice ribbon 222 including suggested radio identifiers, suggested frequency and the identified airport based on the content of the machine interpreted voice command. The voice ribbon display module 36 further embeds the data describing the new voice ribbon into a second chiclet 220 displayed adjacent the chiclet 216 for the first voice ribbon 212. The first chiclet 216 is a selectable UI widget allowing the first voice ribbon 212 to be re-opened and displayed in place of the second voice ribbon 222. When the pilot selects the first chiclet 216, the first voice ribbon 212 of FIG. 22(b) is displayed again allowing the tuning operation to be completed, e.g. by selecting VHF1 and an optional confirmation button, which will cause the radio tuning data to be sent to the radio application for execution. As shown in FIG. 22(d), the first chiclet 216 is removed from the data entry field 218 as this action has been executed whereas the second chiclet 220 remains available for selection so that the pilot can complete the action.

Figure 20A:
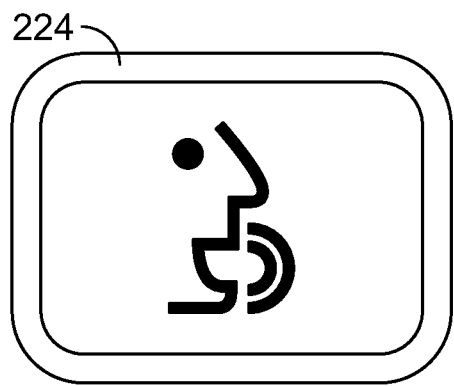
FIGS. 20(*a*) and 20(*b*) depict directional chiclets to indicate which pilot issued a voice command resulting in a voice ribbon embedded in the chiclet, in accordance with an embodiment of the present disclosure.
Figure 20B:
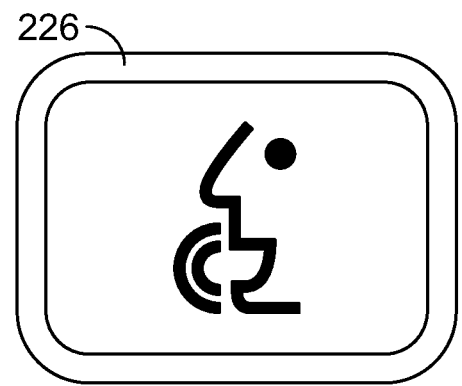
Figure 23A:
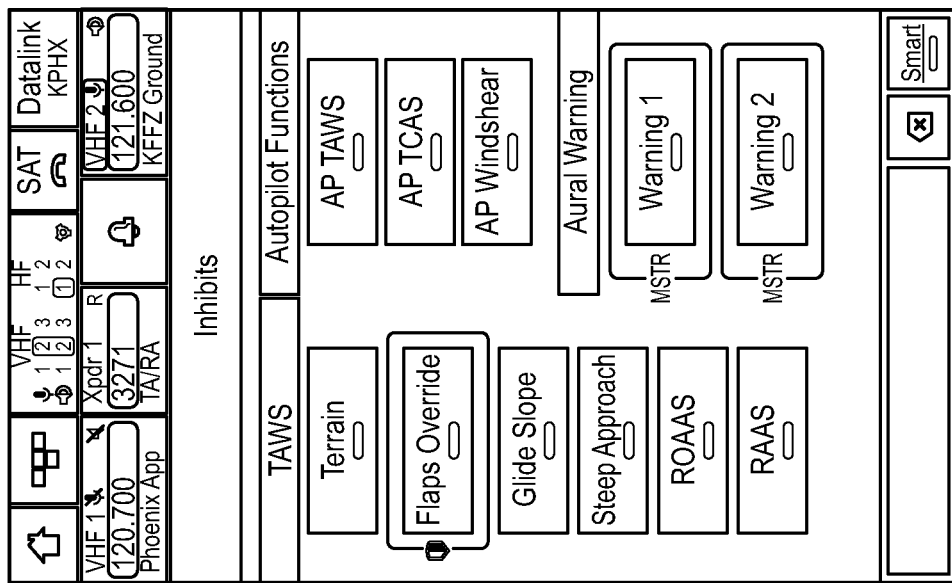
FIGS. 23(*a*) to 23(*c*) depict operational states of a user interface including a voice ribbon including values for attributes determined based on a voice command, in accordance with an embodiment of the present disclosure.
Figure 22D:
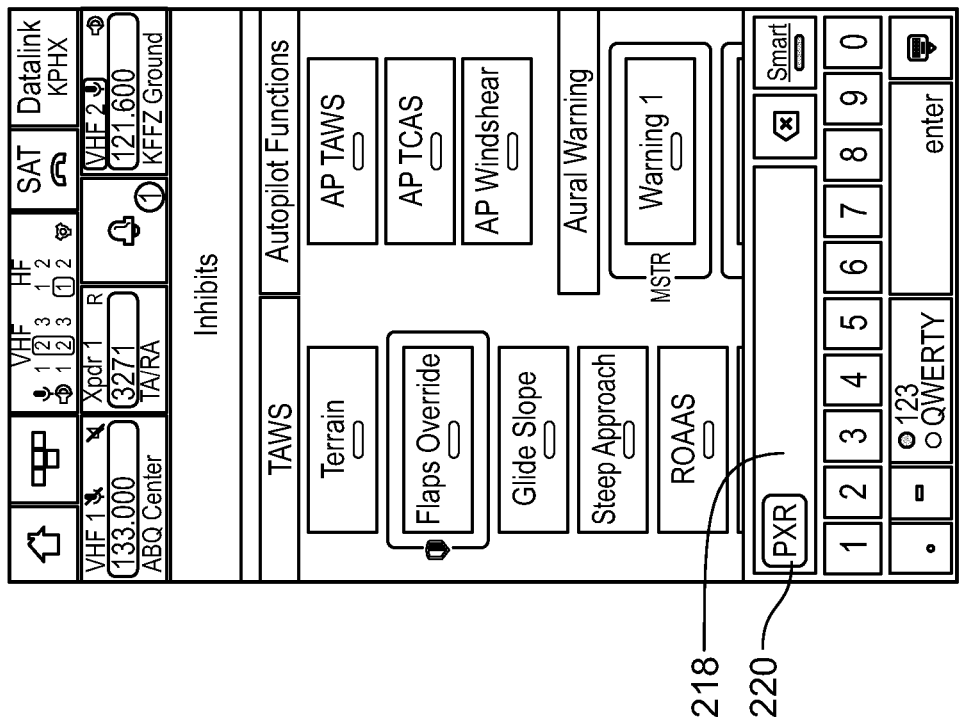
Figure 23C:
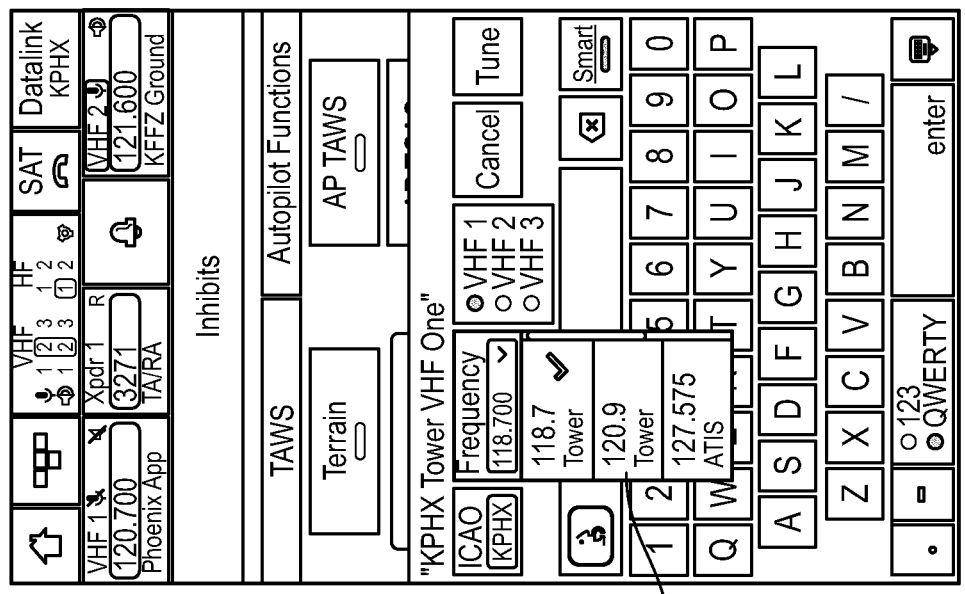
Figure 23B:
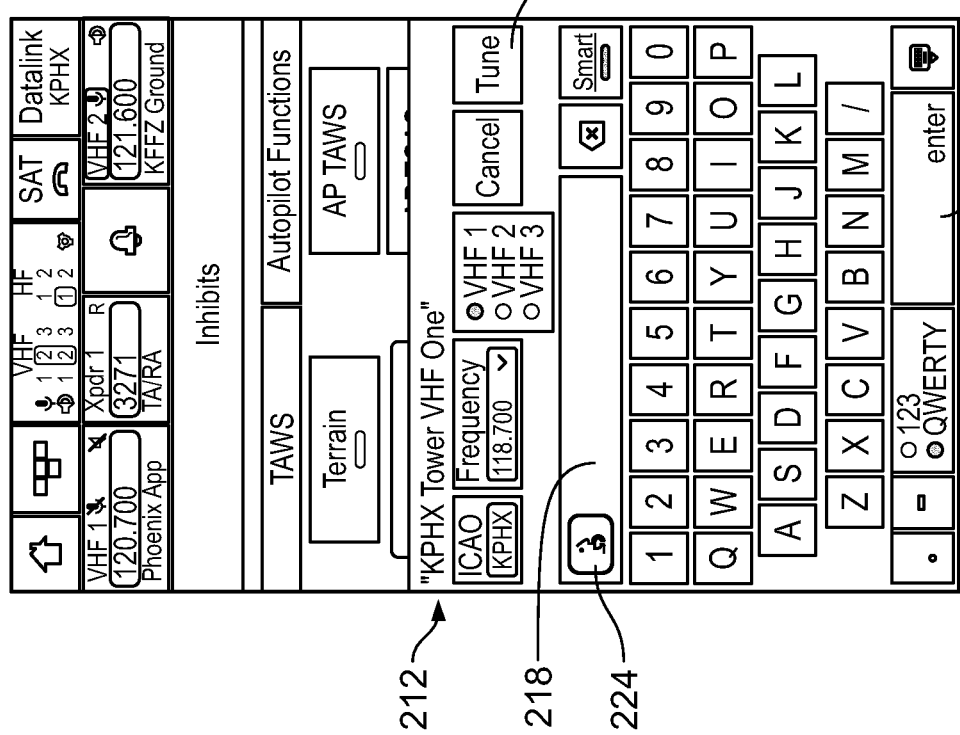

In the foregoing examples, the chiclets include a shorthand description identifying the voice commanded action. Referring to FIGS. 23(a) to 23(c) and FIGS. 20(a) and 20(b), the chiclet may additionally or alternatively include an indication of whether the voice commanded action came from the PIC or the SIC. Turning to FIGS. 20(a) and 20(b), the chiclets 224, 226 are directional to differentiate between a PIC or SIC issued voice command. In the example provided, the chiclets include a right facing simple face drawing to represent a PIC issued voice command and a left facing simple face drawing to represent an SIC issued voice command. However, other directional identifiers could be used such as the letters L and R or other directional graphics. In the example of FIG. 23(a), the PIC has spoken the voice command "KPHX Tower VHF One", which is interpreted by the voice recognition and processing system 20 and the voice ribbon display module 36 responsively displays a voice ribbon 212 in FIG. 23(b). Further, a directional chiclet 224 that embeds the information in the voice ribbon 212 is displayed in the data entry field 218 associated with the virtual keyboard 192. In FIG. 23(c), the pilot changes the frequency by opening the frequency drop down menu 230, which lists frequency values that were suggested by the system based on the information in the machine interpreted voice command. The PIC may select the tune or confirmation button 202 to submit the reviewed and approved values for the various attributes to the radio tuning application (in this example).

Figures 24C, 24D:
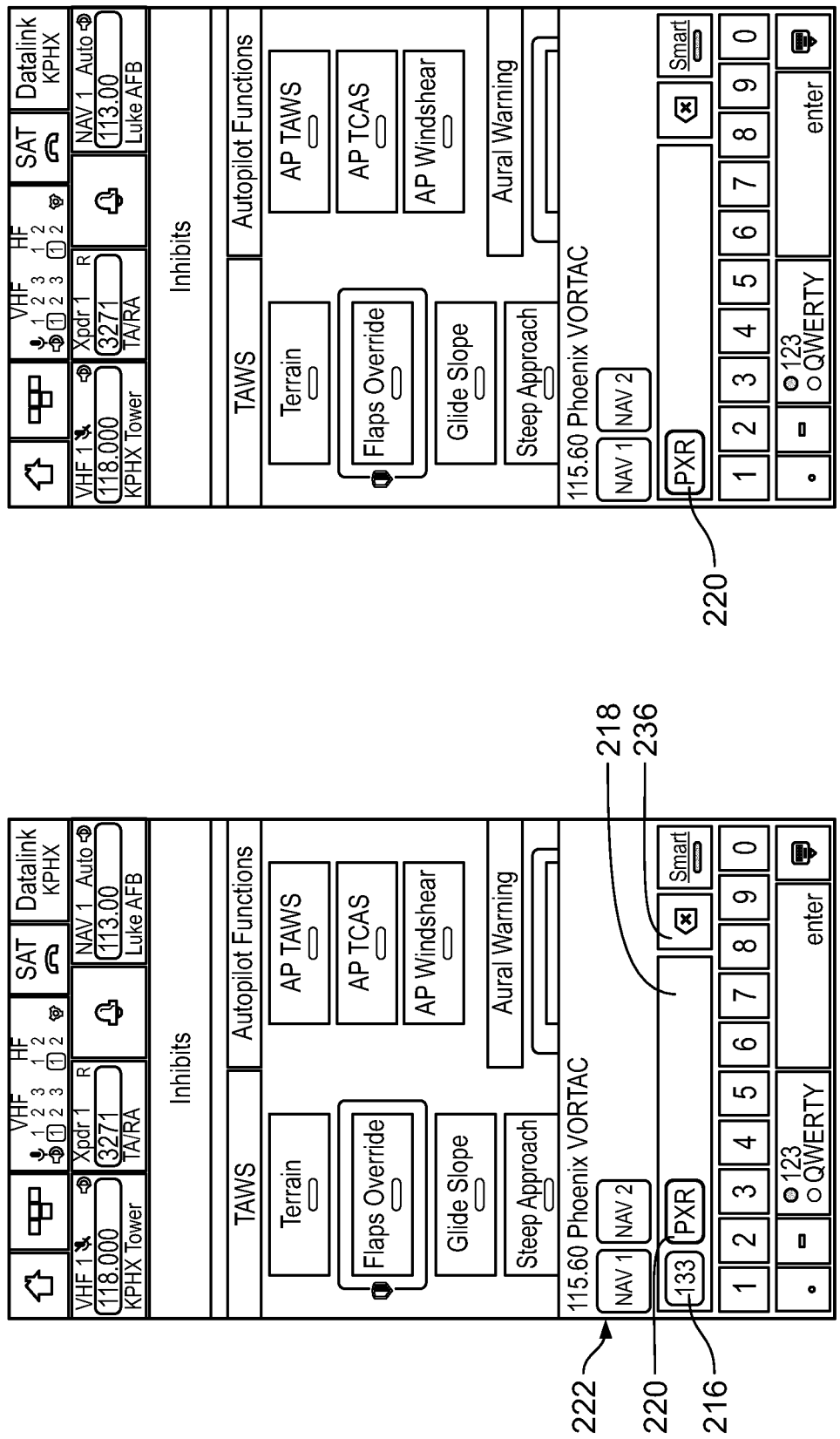
FIGS. 24(*a*) to 24(*e*) depict operational states of a user interface including a voice ribbon including values for attributes determined based on a voice command, in accordance with an embodiment of the present disclosure.
Figure 24E:
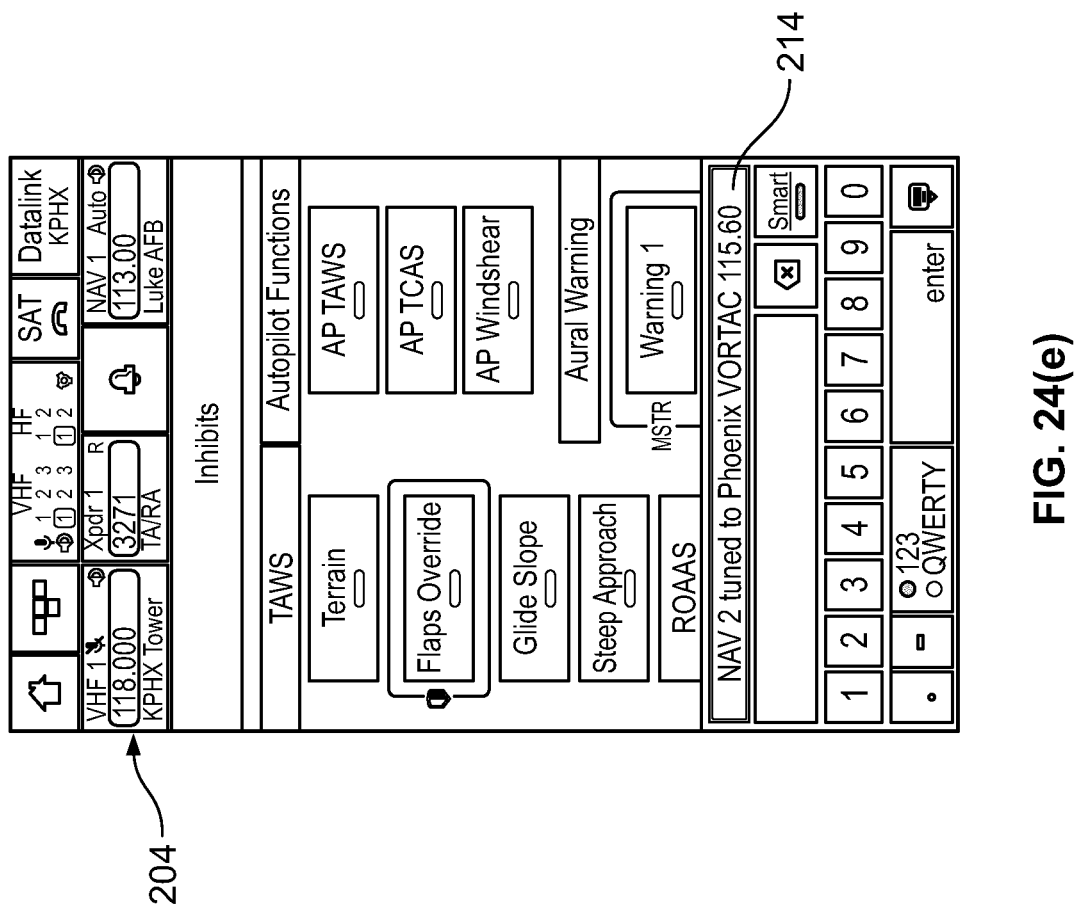

In the exemplary scenario of FIG. 24, first and second voice command chiclets are created by the voice ribbon display module 36 and one of the chiclets is deleted by the pilot. In FIG. 24(a), the pilot speaks the command "VHF One One Thirty Three" to create a first voice ribbon 212 and a first chiclet 216, as shown in FIG. 24(b). The pilot presses the voice command button and speaks a second voice command 48 "Papa Xray Romeo Nav One", which results in the voice ribbon display module 36 replacing the first voice ribbon 212 with a second voice ribbon 222 and placing a second chiclet 220 in the data entry field 218 adjacent the first chiclet 216, as shown in FIG. 24(c). The pilot decided to cancel the data entry for the attributes associated with the first chiclet 216 and does so by selecting the first chiclet 216 and pressing the cancel or delete button 236. As can be seen in FIG. 24(d), the first chiclet 216 has been deleted and the second chiclet can be selected and confirmed in order to submit the value for the various attributes to the radio tuning application. A confirmation banner 214 is shown in FIG. 24(e) since NAV 2 is being tuned in this example and the current status panel 204 does not include the current status of NAV 2. The confirmation banner 214 describes the changes that have been executed by the corresponding flight deck application 16.

Although the chiclets have been described herein with specific reference to voice command data entries, chiclets could similarly be generated based on data entries through other modalities including keyboard (physical or virtual), touchscreen, CCD 50 and other input devices 22.

Figure 25:
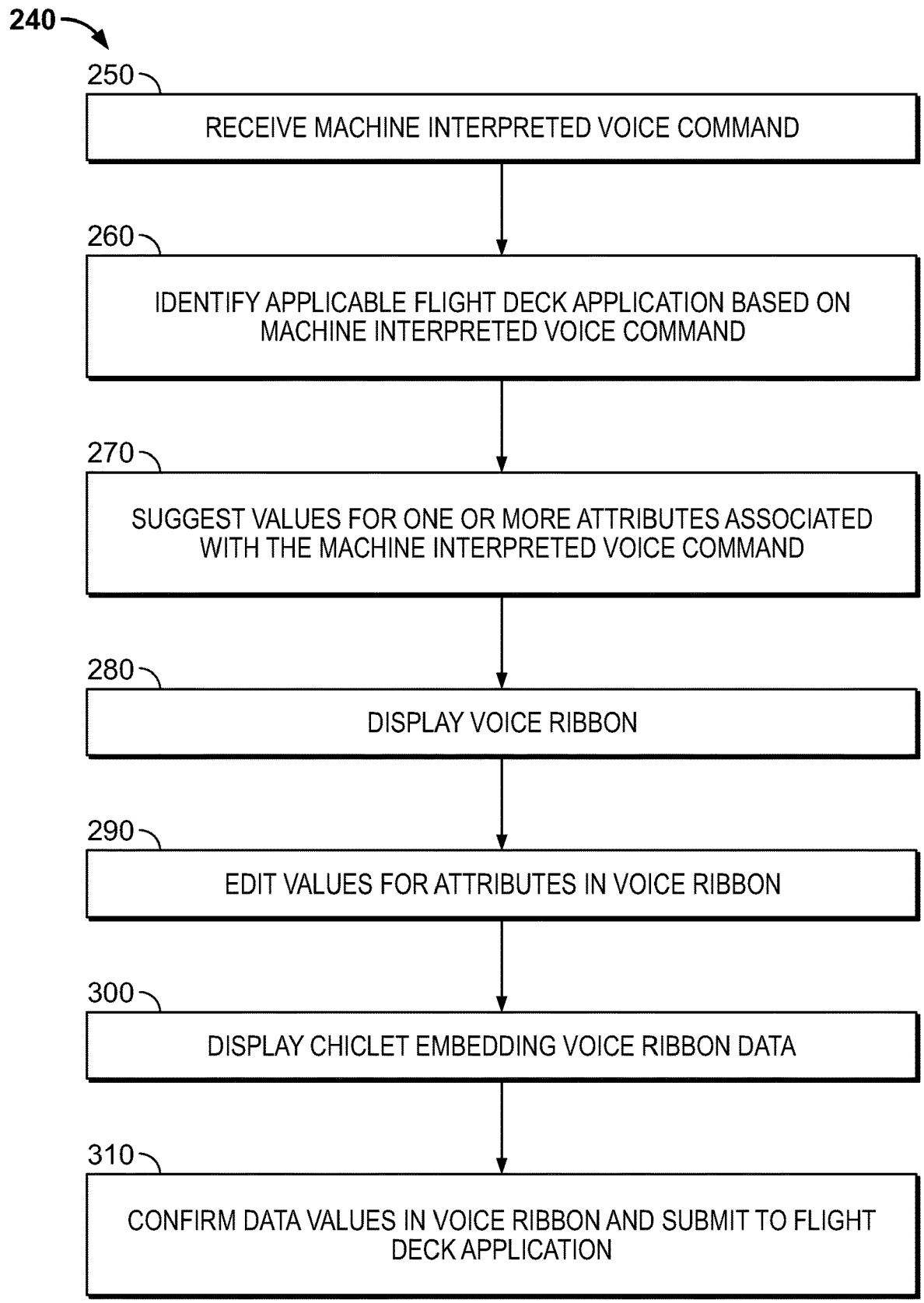
FIG. 25 depicts a flowchart of a method for generating a voice ribbon and corresponding chiclet embedding the voice ribbon, in accordance with an embodiment of the present disclosure.

A method 240 of operation of the voice ribbon display module 36 is described with reference to FIG. 25. In step 250, a machine interpreted voice command is received from the voice recognition and processing system 20 that includes at least one value for an attribute of an application associated with the voice command. In step 260, the applicable flight deck application is identified based on the machine interpreted voice command by interrogating the voice command database 14. In step 270, suggested values for one or more attributes associated with the machine interpreted voice command are determined based on contextual data of the aircraft (e.g. current location, the flight plan, the destination airport from the flight plan and radio information for the destination airport) and based on the content of the machine interpreted voice command. The suggested values may be determined by the flight deck application invoked by the machine interpreted voice command. In step 280, a voice ribbon is displayed that embodies the information in the machine interpreted voice command including values for attributes associated with the command including any additional or alternative suggested values. In optional step 290, the user may edit values of attributes included in the voice ribbon. This editing step can be performed by the user selecting one of a plurality of widgets embodying the different possible values, by selection from a drop down list of values, by re-entering a value or in any other way. In step 300, a chiclet is displayed along with the voice ribbon of step 280 that embeds the information included in the voice ribbon so that a user may move onto a different task and re-open the voice ribbon by selecting the chiclet. The chiclet may be directional to indicate whether the voice command was issued by the PIC or the SIC. In step 310, the user selects a confirmation button to submit the values for the various attributes to the identified flight deck application for execution.

The features and functions described herein of any two or more of the voice modality indication module 40, the voice ribbon display module 36 and the directional feedback module 38 can be combined in accordance with the present disclosure.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A voice activatable flight deck system, comprising:
a display device;
a database including data on acceptable voice commands associated with functions or applications;
a voice recognition and processing system for receiving and processing input voice commands and determining machine commands for the voice activatable flight deck system;
at least one processor in operable communication with the display device, the database and the voice recognition and processing system, the at least one processor configured to execute program instructions, wherein the program instructions are configured to cause the at least one processor to:
display a graphical user interface (UI) comprising a window and at least one functional UI element in the window through which a user is able to enter an input; and
display, based on data from the database, graphical symbology on the graphical UI indicating whether the at least one functional UI element and/or the window allow the user to enter an input by voice command using the voice recognition and processing system,
wherein the program instructions are further configured to cause the at least one processor to:
display a graphical UI screen presenting user selectable options for enabling or disabling voice command input for the at least one functional UI element and/or the window, wherein the user selectable options are user dependent so that a Pilot In Command (PIC) and a Second In Command (SIC) are able to choose their own user selectable options;
set the user selectable options according to a user input from the PIC and from the SIC; and
display the graphical symbology on the graphical UI indicating whether the at least one functional UI element and/or the window allow the PIC or the SIC to enter an input by voice command according to the set user selectable options;
display different graphical symbology to indicate each of when input by voice command is not available, is available but disabled and is available and enabled;
display different graphical symbology for the PIC and the SIC.

2. The voice activatable flight deck system of claim 1, wherein the program instructions are configured to cause the at least one processor to:
receive an input from a cursor control device (CCD);
display a cursor on the graphical UI based on the input from the CCD; and
display the graphical symbology in association with the cursor.

3. The voice activatable flight deck system of claim 1, wherein the program instructions are configured to cause the at least one processor to:
display an icon in the window or as part of a cursor when the at least one functional UI element and/or the window allow the user to enter an input by voice command and not displaying the icon in the window or as part of the cursor when the at least one functional UI element and/or the window does not allow the user to enter an input by voice command.

4. The voice activatable flight deck system of claim 1, wherein the program instructions are configured to cause the at least one processor to:
remove the graphical symbology based on a user input or based on a timer elapsing.

5. The voice activatable flight deck system of claim 1, wherein the program instructions are configured to cause the at least one processor to:
display the graphical user interface (UI) comprising the window and a plurality of functional UI elements in the window;
display different graphical symbology on the graphical UI in association with the plurality of functional UI elements in the window indicating at least one functional UI element allowing the user to enter an input by voice command and at least one functional UI element that does not allow the user to enter an input by voice command.

6. The voice activatable flight deck system of claim 1, wherein the program instructions are configured to cause the at least one processor to:
receive an input from a cursor control device (CCD);
display a cursor on the graphical UI based on the input from the CCD; and
display the graphical symbology in association with the cursor such that the graphical symbology is proximate to, and moves with, the cursor.

7. The voice activatable flight deck system of claim 1, wherein the graphical symbology for the PIC and the SIC differs by:
a placement of the graphical symbology being a left side of a functional UI element and/or a window for the pilot in command and being on a right side for a second in command;
the graphical symbology including a left indicating symbol for the pilot in command and a right indicating symbol for the second in command; or
the graphical symbology including a right facing depiction of a face for the pilot in command and a left facing depiction of a face for the second in command.

8. A voice activatable flight deck system for a cockpit of an aircraft, comprising:
a display device;
speakers;
a voice recognition and processing system for receiving and processing input voice commands and determining machine commands for the voice activatable flight deck system;
at least one processor in operable communication with the display device and the voice recognition and processing system, the at least one processor configured to execute program instructions, wherein the program instructions are configured to cause the at least one processor to:
receive a voice command input to the voice recognition and processing system, wherein the voice command input is from either a pilot in command positioned on a left side of the cockpit or a second in command positioned on a right side of the cockpit;
determine visual feedback and aural feedback to the voice command input; and
output the visual feedback through the display device;
wherein the visual feedback is directional to indicate whether the voice command input is from the pilot in command positioned on the left side of the cockpit or the second in command positioned on the right side of the cockpit by outputting the visual feedback to include a left indicating icon when the voice command input is from the pilot in command positioned on the left side of the cockpit, and outputting the visual feedback to include a right indicating icon when the voice command input is from the second in command positioned on the right side of the cockpit, and wherein the program instructions are configured to cause the at least one processor to:

output the aural feedback to sound predominantly on a left side of the speakers when the voice command input is from the pilot in command positioned on the left side of the cockpit; and output the aural feedback to sound predominantly on the right side of the speakers when the voice command input is from the second in command positioned on the right side of the cockpit.

9. The voice activatable flight deck system of claim 8, wherein the program instructions are configured to cause the at least one processor to:

output the visual feedback on the left side of the display device when the voice command input is from the pilot in command positioned on the left side of the cockpit; and output the visual feedback on the right side of the display device when the voice command input is from the second in command positioned on the right side of the cockpit.

10. The voice activatable flight deck system of claim 8, wherein the left and right indicating icons are provided by a direction of the icon or by designated characters.

11. The voice activatable flight deck system of claim 10, wherein the left and right indicating icons include a left facing face icon and a right facing face icon, respectively.

12. The voice activatable flight deck system of claim 10, wherein the left and right indicating icons include a letter L and a letter R, respectively.

13. The voice activatable flight deck system of claim 11, wherein the speakers are included in a headset.

14. The voice activatable flight deck system of claim 11, wherein the aural feedback is binaural audio.

* * * * *

UNITED STATES PATENT AND TRADEMARK OFFICE
CERTIFICATE OF CORRECTION

PATENT NO. : 11,740,864 B2
APPLICATION NO. : 17/198701
DATED : August 29, 2023
INVENTOR(S) : Steven C. Crouch et al.

It is certified that error appears in the above-identified patent and that said Letters Patent is hereby corrected as shown below:

In the Claims

Column 22, Line 17 (Claim 13), "claim 11" should be -- claim 8 --
Column 22, Line 19 (Claim 14), "claim 11" should be -- claim 8 --

Signed and Sealed this
Sixteenth Day of April, 2024

Katherine Kelly Vidal
Director of the United States Patent and Trademark Office